United States Patent
Kuramoto et al.

(10) Patent No.: US 7,457,507 B2
(45) Date of Patent: Nov. 25, 2008

(54) ORGANOMETALLIC POLYMER MATERIAL

(75) Inventors: Keiichi Kuramoto, Kadoma (JP);
Hitoshi Hirano, Nishinomiya (JP);
Nobuhiko Hayashi, Osaka (JP);
Mitsuaki Matsumoto, Hirakata (JP)

(73) Assignee: Sanyo Electric Co., Ltd., Moriguchi, Osaka (JP)

( * ) Notice: Subject to any disclaimer, the term of this patent is extended or adjusted under 35 U.S.C. 154(b) by 306 days.

(21) Appl. No.: 10/586,664

(22) PCT Filed: Nov. 30, 2005

(86) PCT No.: PCT/JP2005/022007

§ 371 (c)(1),
(2), (4) Date: Jul. 20, 2006

(87) PCT Pub. No.: WO2006/059652

PCT Pub. Date: Jun. 8, 2006

(65) Prior Publication Data

US 2008/0232762 A1    Sep. 25, 2008

(30) Foreign Application Priority Data

Dec. 1, 2004  (JP) ............................. 2004-348888
Feb. 24, 2005 (JP) ............................. 2005-049611

(51) Int. Cl.
*G02B 6/00* (2006.01)

(52) U.S. Cl. .................... 385/141; 385/33; 385/143; 385/145

(58) Field of Classification Search ............. 385/33–35, 385/141–145
See application file for complete search history.

(56) References Cited

U.S. PATENT DOCUMENTS

| 5,175,057 | A |   | 12/1992 | Wengrovius et al. |
| 5,213,899 | A |   | 5/1993  | Lucas |
| 5,496,527 | A |   | 3/1996  | Yokogawa et al. |
| 5,548,021 | A |   | 8/1996  | Liles et al. |
| 5,908,873 | A |   | 6/1999  | Shustack |
| 5,991,493 | A | * | 11/1999 | Dawes et al. ................. 385/141 |
| 6,180,741 | B1 |  | 1/2001  | Yamaguchi et al. |
| 7,396,873 | B2 | * | 7/2008 | Kuramoto et al. ........... 524/588 |
| 2003/0021566 | A1 | * | 1/2003 | Shustack et al. ............ 385/129 |

FOREIGN PATENT DOCUMENTS

| JP | 04-300963 | 10/1992 |
| JP | 04-300964 | 10/1992 |
| JP | 05-186693 | 7/1993 |
| JP | 06-322136 | 11/1994 |
| JP | 07-138375 | 5/1995 |
| JP | 08-208988 | 8/1996 |

(Continued)

*Primary Examiner*—Sung Pak
*Assistant Examiner*—Daniel Petkovsek
(74) *Attorney, Agent, or Firm*—NDQ&M Watchstone LLP

(57) ABSTRACT

An organometallic polymer material is obtained which excels in translucency, shows improved hardness after it is cured and exhibits high reliability at high temperature and high humidity.

Characteristically, the organometallic polymer material contains an organometallic polymer having an —M—O—M— bond (M indicates a metal atom), a metal alkoxide having a single hydrolyzable group and/or its hydrolysate and an organic polymer having a urethane bond and a methacryloxy or acryloxy group, and preferably further contains an organic anhydride and/or an organic acid.

19 Claims, 11 Drawing Sheets

FOREIGN PATENT DOCUMENTS

| | | |
|---|---|---|
| JP | 09-297225 | 11/1997 |
| JP | 10-287717 | 10/1998 |
| JP | 10-292167 | 11/1998 |
| JP | 11-106448 | 4/1999 |
| JP | 2000-034413 | 2/2000 |
| JP | 2000-336281 | 12/2000 |
| JP | 2000-356722 | 12/2000 |
| JP | 2002-512587 | 4/2002 |
| JP | 2003-195070 | 7/2003 |
| JP | 2005-298796 | 10/2005 |
| WO | WO 98/26315 | 6/1998 |
| WO | WO 99/18043 | 4/1999 |
| WO | WO 99/31161 | 6/1999 |

* cited by examiner (a)

(b)

ORGANOMETALLIC POLYMER MATERIAL

TECHNICAL FIELD

The present invention relates to an organometallic polymer material useful for substrates for electrical wiring, machine part materials, various coating materials such as antireflection coatings and surface protection coatings, optical communication devices such as optical transmitters and receiver modules, optical switches and optical modulators, optical propagation path structures such as optical waveguides and optical fibers and lens arrays, and optical devices including those structures such as optical beam splitters, display device-related optical elements (display, liquid crystal projector or the like) such as integrator lenses, microlens arrays, reflectors, light guides and projection screens, glasses, CCD optical systems, lenses, composite aspherical lenses, 2P (photoreplication process) lenses, optical filers, diffraction gratings, interferometers, optical couplers, optical multiplexers and demultiplexers, optical sensors, holographic optical elements, other optical parts, photovoltaic elements, contact lenses, medical artificial tissues, mold materials for light emitting diodes (LED), and the like.

BACKGROUND ART

Inorganic materials such as metals and ceramics excel in heat resistance, mechanical strength, electrical properties, optical properties and chemical stability, which make them widely applicable in industry. However, they are generally brittle and high in hardness. Accordingly, they must be processed or machined at high temperature in order to impart desired shapes thereto. This sometimes limits their uses.

On the other hand, organic polymers are superior in moldability and flexible, which make them well processable. However, they are mostly inferior in heat resistance and chemical stability to inorganic materials. This has led to recent extensive development of organic polymers using metal alkoxides as starting material, called organic-inorganic hybrid materials or organic-inorganic nanocomposites.

Application of such organic-inorganic hybrid materials to optical waveguides is contemplated in Patent Literatures 1 and 2.

However, in either case, a so-called sol-gel process is utilized in which a metal alkoxide is used as a starting material and water is optionally added to effect a hydrolysis reaction. As a result, a large amount of water ($H_2O$) or silanol groups (Si—OH) is left in materials. In particular, silanol groups are hard to remove as by heating and accordingly become a main cause of optical loss primarily in the infrared region. In particular, their influence becomes significant in the region around 1500 nm which overlaps a wavelength band for optical communication.

Patent Literature 1: Japanese Patent Kokai No. 2000-356722

Patent Literature 2: Japanese Patent Kohyo No. 2001-506372

Patent Literature 3: Japanese Patent Kokai No. Hei 6-322136

Patent Literature 4: Japanese Patent Kokai No. 2003-195070

Patent Literature 5: Japanese Patent Kokai No. 2000-336281

Patent Literature 6: Japanese Patent Kokai No. 2000-34413

DISCLOSURE OF THE INVENTION

It is an object of the present invention to provide an organometallic polymer material which excels in translucency, shows improved hardness after it is cured and exhibits high reliability at high temperature and high humidity, and optical parts using the organometallic polymer material.

The organometallic polymer material of the present invention is characterized as containing an organometallic polymer having an —M—O—M— bond (M indicates a metal atom), a metal alkoxide having a single hydrolyzable group and/or its hydrolysate, and an organic polymer having a urethane bond and a methacryloxy or acryloxy group.

The organometallic polymer material of the present invention contains the aforementioned organometallic polymer, metal alkoxide and/or its hydrolysate, and organic polymer. The organic polymer has a urethane bond and a methacryloxy or acryloxy group and can be illustrated by an organic polymer which is obtained by reacting a polyol at its terminal ends with a compound having a hydroxyl and a methacryloxy or acryloxy group through the use of polyisocyanate such as diisocyanate.

One example of such an organic polymer is generally called an acrylate resin and specifically has the following structure:

AC-IS-PO-IS-AC where, AC represents a portion having a methacryloxy or acryloxy group (acrylate or methacrylate portion), IS represents a portion having a urethane bond (isocyanate portion) and PO represents a polyol portion.

If lower water absorption is desired, an acrylate resin having a highly hydrophobic phenyl group or a bisphenol A structure is preferably used.

In at least one of AC-IS and IS-PO in the above structure, two portions are held together by a urethane bond. The presence of the urethane bond is very important in the present invention. By a cohesive force of a hydrogen bond based on the urethane bond, a cured product of the organometallic polymer material of the present invention is imparted thereto flexibility and toughness and further protected against development of cracks at high temperature and high humidity.

The aforementioned AC portion has a polymerizable group (carbon double bond) and, when exposed to a light or heat energy, acts to induce polymerization of the organic polymer itself or form bonds with aforementioned organometallic polymer so that the organometallic polymer material is cured.

Also, optional introduction of a polymerizable group in the organometallic polymer allows polymerization thereof with the AC component in the organic polymer, resulting in the formation of stronger bonds.

The PO portion is a portion which imparts properties such as flexibility to the organic polymer, and may comprise polyester polyol, polyether polyol, polycarbonate polyol, polycaprolactone polyol, silicone polyol or polybutadiene polyol, for example.

The organic polymer may have a polybutadiene structure or an aryl group in its skeleton, for example. Examples of aryl groups include phenyl and naphthyl.

Preferably, an aryl group is introduced into at least a part of the polyol, isocyanate and (meth)acrylate portions of the organic polymer and further into the organometallic polymer. This is because a binding force produced due to overlapping of π electron clouds of neighboring aryl groups not only enhances binding of those portions but also suppresses separation of the organometallic polymer from the organic polymer to result in obtaining higher translucency.

When necessary, a polyfunctional (meth)acrylate or monofunctional (meth)acrylate may be added in order to adjust a viscosity of the solution prior to being cured by exposure to heat, light or other form of energy, or adjust hardness or other mechanical properties of a cured product. In particular, a polyfunctional or monofunctional (meth)acrylate containing an aryl group in a molecule has a high molecular refraction and accordingly its addition facilitates adjustment of refractive index. Further, the overlapping of π electron clouds of such an aryl group and the one introduced in the organometallic polymer or organic polymer produces a binding force that enhances binding.

Examples of polyfunctional (meth)acrylates include bifunctional (meth)acrylates such as ethylene glycol di(meth)acrylate, propylene glycol di(meth)acrylate, polyethylene glycol di(meth)acrylate, polypropylene glycol di(meth)acrylate, 1,6-hexanediol di(meth)acrylate, glycerin di(meth)acrylate, di(meth)acrylate of 2,2-dimethyl-3-hydroxypropyl-2,2-dimethyl-3-propionate, 1,4-butanediol di(meth)acrylate, neopentyl glycol di(meth)acrylate, di(meth)acrylate of neopentyl glycol hydroxypivalinate, di (meth)acrylate of a propylene oxide adduct of bisphenol A, di(meth)acrylate of 2,2'-di(hydroxypropoxyphenyl)propane, di(meth)acrylate of 2,2'-di(hydroxyethoxyphenyl)propane, di(meth)acrylate of an ethylene oxide adduct of bisphenol A, di(meth)acrylate of dimethylol tricyclodecane and an adduct of 2,2'-di (glycidyloxyphenyl)propane with di (meth)acrylic acid. Other examples include pentaerithritol tri(meth)acrylate, pentaerithritol tetra(meth)acrylate, tromethylolpropane tri(meth)acrylate, dipentaerithritol hexa(meth)acrylate, tri(meth)acrylate of trimellitic acid, triallyl trimellitate, tri (meth)acrylate of triallylisocyanurate, tri (meth)acrylate of tris(2-hydroxyethyl)isocyanurate, tri(meth)acrylate of tris(hydroxypropyl) isocyanurate, tetramethylolmethane tri(meth)acrylate, tetramethylolmethane tetra(meth)acrylate and the like.

Examples of monofunctional (meth)acrylates include benzyl (meth)acrylate, ethyl (meth)acrylate, methyl (meth)acrylate, isobornyl (meth)acrylate, cyclohexyl (meth)acrylate, dicyclopentyl (meth)acrylate, α-naphthyl (meth)acrylate, β-naphthyl (meth)acrylate, dicyclopentenyl-oxyethyl (meth)acrylate, bornyl (meth)acrylate and phenyl (meth)acrylate.

The organic polymer having the above-described structure is generally called a urethane acrylate resin and has been conventionally used as a material for formation of a transparent resin layer on a glass base in the manufacture of a composite aspherical lens or other optical parts. However, optical parts using such a polyurethane acrylate resin alone have suffered from a problem of insufficient reliability at high temperature and high humidity. That is, there has been a high tendency for them to produce cracks at high temperature and high humidity. Further, they have suffered from the following problems: they are easily scratched because of low hardness; and they are insufficient in heat resistance.

The combined use of such a urethane acrylate resin and the aforementioned organometallic polymer and metal alkoxide and/or its hydrolysate, according to the present invention, has been found to solve the above-described conventional problems, i.e., improve reliability at high temperature and high humidity, such as stability of refractive index in a high-temperature and high-humidity test (85° C., 85%, 500 hours) and enhance hardness and heat resistance. The present invention is based on such findings of the inventor of this application.

In the present invention, acryloxy is used equivalently in its meaning to acryloyl, while methacryloxy to methacryloyl. The (meth)acrylate is the term used to describe acrylate and methacrylate, collectively. The (meth)acryloyl is the term used to describe acryloyl and methacryloyl, collectively.

In the present invention, a metal alkoxide and/or its hydrolysate is contained. This metal alkoxide and/or its hydrolysate may be contained in the state of being either joined or unjoined to the organometallic polymer. The hydrolysate of the metal alkoxide may be in the form of a polycondensate of the hydrolysate.

In the present invention, the inclusion of the metal alkoxide having a single hydrolyzable group and/or its hydrolysate reduces an optical propagation loss in the 1,450-1,550 nm wavelength range, because it is able to react to —OH groups produced at molecular terminals of the organometallic polymer and thereby decompose those —OH groups.

In an exemplary case where the metal atom M is Si, the organometallic polymer may have an alkoxy group represented by —Si—O—R at its molecular end. This alkoxy group hydrolyzes upon absorption of water to produce a silanol group by the following reaction.

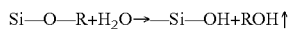

ROH produced in the above reaction readily passes off by evaporation. The silanol group, if present, lowers a transmittance.

The inclusion of the metal alkoxide having a single hydrolyzable group and/or its hydrolysate, according to the present invention, results in decomposition of a silanol group if produced via the above-described reaction. For example, an alkoxysilane having a single alkoxy group represented by the following formula is hydrolyzed in the following fashion upon absorption of water.

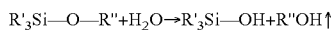

In this reaction, R"OH passes off by evaporation. The hydrolysate produced by the above reaction reacts to a terminal silanol group of the organometallic polymer in the following fashion.

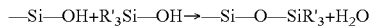

By this reaction, the silanol group at a molecular terminal of the organometallic polymer disappears. In accordance with the present invention, a high transmittance can be therefore maintained for an extended period of time.

Since the metal alkoxide is hydrolyzed and then acts as a hydrolysate, as described above, it may be contained in the form of either a metal alkoxide or a hydrolysate. In the case where the metal alkoxide or its hydrolysate is contained in the state of being unjoined to the organometallic polymer, if the organometallic polymer again absorbs water to produce a terminal silanol group, the metal alkoxide or its hydrolysate unjoined thereto reacts to this terminal silanol group to decompose it in the fashion described above.

In the present invention, the metal alkoxide or its hydrolysate may contain a fluorine atom. That is, a hydrogen atom in a hydrocarbon portion of the metal alkoxide or its hydrolysate may be replaced by the fluorine atom.

In the present invention, M in the —M—O—M— bond in the organometallic polymer is preferably Si, Ti, Bn or Zr, or any combination thereof. Si is particularly preferred. In case of Si, the organometallic polymer can be derived from a silicone resin, for example.

Examples of useful metal alkoxides having a single hydrolyzable group in the present invention include trimethylmethoxysilane, trimethylethoxysilane, triethyl-methoxysilane, triethylethoxysilane, tripropylmethoxysilane, tripropylethoxysilane, benzyldimethylmethoxysilane, benzyldimethylethoxysilane, diphenylmethoxymethylsilane, diphenylethoxymethylsilane, acetyltriphenylsilane and ethoxytriphenylsilane.

Preferably, the organometallic polymer material of the present invention further contains an organic anhydride and/or organic acid.

Since the organic anhydride undergoes hydrolysis upon absorption of water, inclusion thereof leads to a reduction in water content of the organometallic polymer. This reduces an absorption attributed to the presence of water. Accordingly, a transmittance can be increased even when only the organic anhydride is added. The organic acid incorporated in the organometallic polymer promotes a reaction of the silanol group and the like and thus promotes decomposition of the silanol group and the like. For example, the organic acid can also promote a reaction between silanol groups at molecular ends of the organometallic polymer.

For the following reasons, it is preferred that the organic anhydride and/or organic acid is also contained in the organometallic polymer material in the present invention. That is, the organic anhydride and/or organic acid, if contained in combination with the metal alkoxide having a single hydrolyzable group and/or its hydrolysate, not only removes water but also promotes a reaction in which a hydrolysate of the metal alkoxide having a single hydrolyzable group reacts to an —OH group produced at a molecular end of the organometallic polymer to thereby decompose the —OH group.

In Patent Literatures 3 and 4, trifluoroacetic acid is used as a catalyst to promote hydrolysis of a hydrolyzable silane compound. It is added to acidify a reaction solution in the course of a sol-gel process where a reaction is continued with the addition of water. Trifluoroacetic anhydride is not used because it is immediately converted to trifluoroacetic acid as a result of a violent reaction with water. No disclosure is provided as to the addition thereof to a final product (cured product) as performed in the present invention, nor do they disclose the optical propagation loss reducing effect due to acid anhydrides.

Trifluoroacetic anhydride or trifluoroacetic acid, if used, is preferably added in the amount within a detectable level by infrared absorption spectroscope. Specifically, a ratio of a trifluoroacetic acid absorption peak height (around 1,780 cm$^{-1}$) to an absorption peak height (around 1,100 cm$^{-1}$) due to SiO is preferably at least 0.05.

The metal alkoxide or its hydrolysate may be present in the form of alkoxysilane or its hydrolysate which can be illustrated by the one having the following general formula.

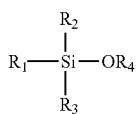

(wherein, $R_1$, $R_2$ and $R_3$ are independently an organic group, preferably an alkyl group, and $R_4$ is an alkyl group having 1-4 carbon atoms).

Specific examples include trialkylalkoxysilanes such as trimethylalkoxysilane and triethylalkoxysilane. Examples of alkoxy groups include methoxy and ethoxy.

Specific examples of organic anhydrides include trifluoroacetic anhydride, acetic anhydride and propionic anhydride. Use of trifluoroacetic anhydride is particularly preferred. Specific examples of organic acids include trifluoroacetic acid, acetic acid, propionic acid. Use of trifluoroacetic acid is particularly preferred.

In the present invention, the organometallic polymer can be synthesized via hydrolysis and polycondensation of at least two organometallic compounds having a hydrolyzable group. Examples of organometallic compounds include trialkoxysilane and dialkoxysilane both containing an organic group. Examples of organic groups include alkyl, aryl and aryl-containing groups. A phenyl group is preferred among aryl groups. More preferred examples are phenyltrialkoxysilane and diphenyl-dialkoxysilane. Further preferred are phenyltriethoxysilane, phenyltrimethoxysilane, diphenyldimethoxysilane and diphenyldiethoxysilane.

Preferably, the organometallic compounds include an organometallic compound having a functional group capable of crosslinking by exposure to heat and/or an energetic radiation such as an ultraviolet or electron radiation. Examples of such crosslinkable groups include acryloxy, methacryloxy, styryl, epoxy and vinyl. Trialkoxysilane having any of such groups is preferably used.

In the case where an organometallic compound having a free-radically polymerizable functional group such as an acryloxy, methacryloxy, styryl or vinyl group is contained, a free-radical polymerization initiator is preferably contained. Examples of free-radical polymerization initiators include 1-hydroxy-cyclohexyl-phenyl-ketone, 2-hydroxy-2-methyl-1-pheny-propane-1-one, 2-benzyl-2-dimethylamino-1-(4-morpholino-phenyl)-butanone-1, oxy-phenyl-acetic acid-2-[2-oxo-2-phenyl-acetoxy-ethoxy]-ethyl-ester, oxy-phenyl-acetic acid-2-[2-hydroxy-ethoxy]-ethyl-ester and their mixtures.

In the case where an organometallic compound having an epoxy group is contained, a curing agent is preferably contained. Examples of such curing agents include amine curing agents, imidazole curing agents, phosphate curing agents and acid anhydride curing agents. Specific examples thereof include methylhexahydrophthalic anhydride, hexahydrophthalic anhydride and tetraethylene pentamine.

If an organometallic compound having a functional group and an organometallic compound having no functional group are used in combination, they are preferably blended in the weight ratio (organometallic compound having a functional group: organometallic compound having no functional group) of 5-95: 5-95.

The organometallic polymer material of the present invention preferably contains the organometallic polymer in the amount of 5-95% by weight, more preferably 40-95% by weight. The excessively small amount of the organometallic polymer increases a possibility of producing cracks at high temperature and high humidity and leads to a main cause of light absorption or light scattering. On the other hand, the excessively large amount of the organometallic polymer reduces heat resistance and results in deterioration under high-temperature atmosphere that lowers optical properties, particularly a translucency.

The organometallic polymer material of the present invention is rendered more transparent by incorporating the organometallic polymer in the above-specified range of 5-95% by weight. For example, a transmittance of at least 80% is obtained for a 3 mm thick sample when exposed to a radiation at a wavelength of 630 nm. A transmittance of at least 90% is obtained if the organometallic polymer is contained in the range of 40-95%.

The organometallic polymer material of the present invention preferably contains the metal alkoxide or its hydrolysate in the amount of 0.1-15 parts by weight, more preferably 0.2-2.0 parts by weight, based on 100 parts by weight of the organometallic polymer. The excessively small amount of the metal alkoxide or its hydrolysate permits OH groups to remain. This increases a light absorption in the 1,450-1,550 nm wavelength range and a water absorption, and thus promotes deterioration. On the other hand, the excessively large amount of the metal alkoxide or its hydrolysate permits the metal alkoxide or its hydrolysate to leave excessively from the material when placed under high-temperature circumstances, which possibly leads to production of cracks.

The organometallic polymer material of the present invention preferably contains the organic anhydride or organic acid in the amount of 0.1-10 parts by weight, more preferably 1-5 parts by weight, based on 100 parts by weight of the organometallic polymer. The excessively small amount of the organic anhydride or organic acid leads to insufficient removal of OH groups by the metal alkoxide having a single hydrolyzable group. On the other hand, the excessively large amount of the organic anhydride or organic acid permits the metal alkoxide or its hydrolysate to leave excessively from the material when placed under high-temperature circumstances, which possibly leads to production of cracks.

In the organometallic polymer material of the present invention, it is preferred that a difference in refractive index between a cured product of the organometallic polymer and a cured product of the organic polymer does not exceed 0.01. If the refractive index difference is rendered to fall within 0.01, light scattering due to the refractive index difference at an interface between an organometallic polymer region and an organic polymer region in the material is suppressed, resulting in obtaining a transmittance of at least 90%.

In the organometallic polymer material of the present invention, it is also preferred that a difference in refractive index between the organometallic polymer in its liquid state prior to being cured and the organic polymer in its liquid state prior to being cured does not exceed 0.02. If the refractive index difference between them, each in a liquid state prior to being cured, is rendered to fall within 0.02, the material after cured exhibits a transmittance of at least 90%.

The organometallic polymer material of the present invention preferably has an absorption peak around 850 $cm^{-1}$, due to the metal alkoxide, in the IR measurement chart. Such an absorption peak provides an evidence that a trimethylsilyl group as the metal alkoxide having a single hydrolyzable group is sufficiently contained in the material, which guarantees efficient removal of OH groups in the material.

The organometallic polymer material of the present invention preferably contains fine particles composed of at least one of a metal, metal oxide and metal nitride. Preferably, those fine particles do not exceed 100 nm in size.

Examples of metals in the particulate form include gold, silver and iron.

Examples of metal oxides in the particulate form include silicon oxide, niobium oxide, zirconium oxide, titanium oxide, aluminum oxide, yttrium oxide, cerium oxide and lanthanum oxide. The use of silicon oxide, niobium oxide, zirconium oxide and titanium oxide, among them, is preferred.

Examples of metal nitrides in the particulate form include aluminum nitride, zirconium nitride and titanium nitride.

The refractive index of the organometallic polymer material of the present invention can be adjusted to a lower or higher value by adding fine particles having a lower or higher refractive index. Examples of metal oxide particles capable of shifting the refractive index of the organometallic polymer material to a higher value include niobium oxide ($Nb_2O_5$) particles, zirconium oxide ($ZrO_2$) particles and titanium oxide ($TiO_2$) particles. Fine particles of silicon oxide ($SiO_2$) may be added to shift the refractive index to a lower value, for example.

The present invention also provides a method for production of an organometallic polymer material, in which at least two organometallic compounds having a hydrolyzable group are hydrolyzed and polycondensed to thereby synthesize an organometallic polymer and in which an organic anhydride and/or organic acid is added to the organometallic polymer material. The production method is characterized as including the steps of allowing the organometallic compounds to undergo hydrolysis and polycondensation in an organic solvent to synthesize an organometallic polymer; subsequent to removal of the organic solvent, adding an organic anhydride and/or organic acid; subsequent to removal of an excess portion of the organic anhydride and/or organic acid, adding a metal alkoxide and/or its hydrolysate; and, subsequent to removal of an excess portion of the metal alkoxide and/or its hydrolysate, adding an organic polymer.

Preferably, the production method of the present invention further includes a step of performing rinsing to remove hydrophilic components, subsequent to removal of an excess portion of the metal alkoxide and/or its hydrolysate but prior to addition of the organic polymer.

By this rinsing step, hydrophilic components (organic acid, hydrolysate of the organometallic compounds and other low-molecular compounds), if remain in excess amount, can be removed from the material. As a result, a water absorption of the resulting organometallic polymer material can be lowered.

The optical part of the present invention is characterized as having a light transmissive region formed using the organometallic polymer material of the present invention.

A specific example of the optical part of the present invention is the one which has a light transmissive region formed on a base material such as a translucent glass, ceramic or plastic by using the organometallic polymer material of the present invention. In the fabrication of thinner optical parts, a high-refractive glass or high-refractive translucent ceramic may preferably be used as the base material.

The optical part of the present invention can be illustrated by a composite aspherical lens. This composite aspherical lens is made by forming a light transmissive region, in the form of a translucent resin layer, on a spherical lens such as of a glass. Since the organometallic polymer material of the present invention contains the organometallic polymer and the metal alkoxide and/or its hydrolysate, as described above, it shows good adhesion such as to a glass. Accordingly, the use of the organometallic polymer material of the present invention results in the provision of a light transmissive region firmly adhered onto a glass base. Since the optical part of the present invention is made using the organometallic polymer material of the present invention, it exhibits high reliability at high temperature and high humidity and superior hardness and heat resistance.

The camera module of the present invention is characterized as including the optical part of the present invention. Examples of those using the camera module of the present invention include portable phones and back monitors for cars.

The portable phone of the present invention is characterized as including the camera module of the present invention.

The projector of the present invention is characterized as including the optical part of the present invention. A liquid crystal projector is a specific example.

The optical waveguide of the present invention is characterized as including a core layer and/or a cladding layer formed using of the organometallic polymer material of the present invention.

The optical waveguide of the present invention may further include an electrical power wire.

The organometallic polymer material of the present invention, because of inclusion of the organometallic polymer, metal alkoxide and/or its hydrolysate and organic polymer, has good translucency, exhibits high hardness after it is cured, and enjoys high reliability at high temperature and high humidity.

The organometallic polymer material of the present invention, as well as the optical parts using the polymer material, have improved reliability at high temperature and high humidity and high hardness and heat resistance, which make them useful for electrical wiring substrate, machine part materials, various coating materials such as antireflection films and surface protection films, optical communication devices such as optical transmitter and receiver modules, optical switches and optical modulators, optical propagation path structures such as optical waveguides, optical fibers and lens arrays, optical devices including those structures such as optical beam splitters, display device (display, liquid crystal projector or the like) related optical elements such as integrator lenses, microlens arrays, reflectors, light guides and projection screens, glasses, CCD optical systems, lenses, composite aspherical lenses, 2P (photoreplication process) lenses, optical filers, diffraction gratings, interferometers, optical couplers, optical multiplexers and demultiplexers, optical sensors, holographic optical elements, other optical part materials, photovoltaic elements, contact lenses, medical artificial tissues, mold materials for light emitting diodes (LED) and the like.

EXPLANATION OF REFERENCE NUMERALS

Figure 1:
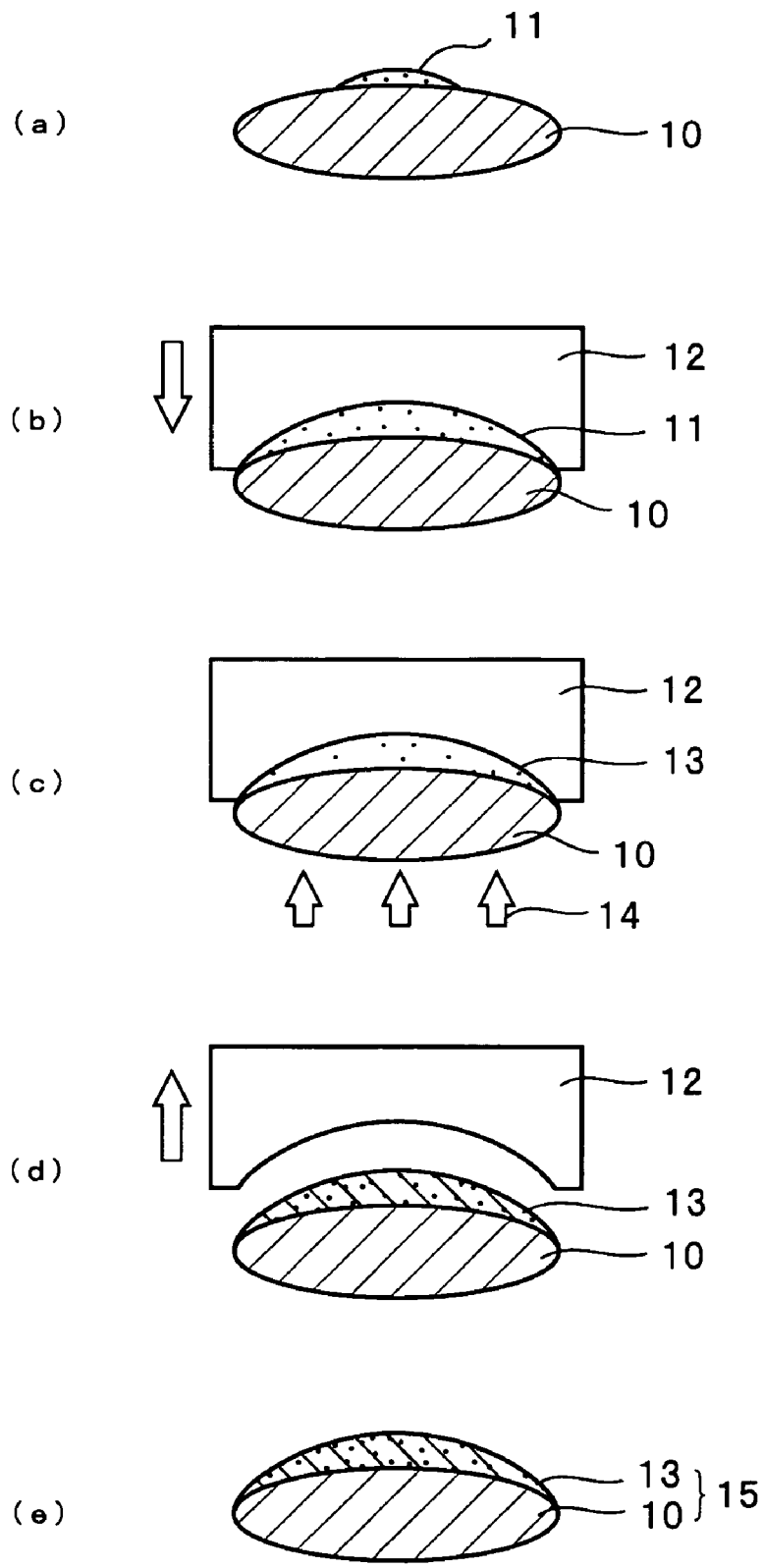
FIG. 1 is a schematic sectional view, illustrating a fabrication process of a composite aspherical lens.

10 . . . glass spherical lens
11 . . . viscous liquid
12 . . . mold
13 . . . resin layer
14 . . . ultraviolet radiation
15 . . . composite aspherical lens
16 . . . CCD camera
17 . . . lens
18 . . . screen with a mesh pattern
19 . . . mesh pattern
20 . . . camera module
21, 22, 23, 24 . . . aspherical lens
25 . . . image pickup element
30 . . . portable phone
31 . . . TV tuner
32 . . . hard disc drive
33 . . . display
34 . . . keyboard
35 . . . battery
40 . . . optical waveguide
41 . . . core layer
42 . . . cladding layer
43 . . . substrate
44 . . . polyimide film
45 . . . polyimide mold layer
46 . . . power wiring
50 . . . liquid crystal projector
51 . . . projection optical system
52 . . . illumination optical system
53 . . . radiation source
54, 55 . . . half mirror
56, 57, 58 . . . mirror
59 . . . cross prism
60, 61, 62 . . . lens
63, 64, 65 . . . liquid crystal panel

BEST MODE FOR CARRYING OUT THE INVENTION

The following examples illustrate the practice of the present invention in detail but are not intended to be limiting thereof.

Organometallic polymer materials were synthesized in Examples 1-8 and Comparative Examples 1-3 according to the following procedures.

EXAMPLES 1 and 6-8

Organometallic polymer materials were synthesized according to the following process S.

(Process S)

(1)

Organometallic compound A shown in Table 1: 10 ml
Organometallic compound B shown in Table 1: 4.1 ml
Aqueous solution containing hydrochloric acid (2N conc. chloric acid: 1.65 ml) as a reaction catalyst
Ethanol: 20.5 ml The ingredients specified above were mixed and left to stand for 24 hours so that the organometallic compounds A and B underwent hydrolysis and polycondensation.

(2)

4 ml of the resulting polycondensate liquid was taken in a laboratory dish. 10 mg of 1-hydroxy-cyclohexyl-phenyl-ketone as a polymerization initiator was dissolved. The resultant was heated at 100° C. to remove ethanol by evaporation. As a result, about 1 g of a viscous liquid A was obtained.

Viscous liquid A: 1 g
Metal alkoxide X shown in Table 1: 3 ml
Organic acid Y shown in Table 1: 0.8 ml The ingredients specified above were mixed, allowed to stand for 24 hours and then heat dried to remove excess metal alkoxide X and organic acid Y by evaporation. As a result, a viscous liquid B was obtained.

(3)

0.45 g (45% by weigh) of the organic polymer ZZ specified in Table 1 and 0.55 g of the viscous liquid B were mixed and then stirred to obtain a viscous liquid C.

This viscous liquid C was cured by exposure to an ultraviolet radiation. The cured sample was evaluated in the manner as described below. The results are shown in Table 1.

The following resins were used as the organic polymer ZZ in Examples, respectively.

Example 1: urethane Acrylate Photocurable Resin
Example 6: polyester acrylate photocurable resin
Example 7: epoxy acrylate photocurable resin
Example 8: silicone acrylate photocurable resin The specific details of the above photocurable resins are as follows.

The urethane acrylate photocurable resin has an AC portion consisting of a methacryloyl group and an IS-PO portion consisting of a urethane prepolymer.

The polyester acrylate photocurable resin has an AC portion consisting of an acryloyl group and an IS-PO portion consisting of alcohol.

The epoxy acrylate photocurable resin has an AC portion consisting of a methacryloyl group and an IS-PO portion consisting of glycidyl ether.

The silicone acrylate photocurable resin has an AC portion consisting of a methacryloyl group and an IS-PO portion consisting of a prepolymer containing a silicone (Si—O) bond.

EXAMPLE 2

The procedure of Example 1 was repeated, with the exception that 3-methacryloxypropyltrimethoxysilane was used as the organometallic compound A and pentaethoxyniobium was used as the organometallic compound B.

EXAMPLE 3

The procedure of Example 1 was repeated, with the exception that 3-methacryloxypropyltrimethoxysilane was used as the organometallic compound A and zirconium isopropoxide was used as the organometallic compound B.

EXAMPLES 4 and 5

The organometallic polymer material was synthesized by the following process R.

(Process R)

The process S was followed using the organometallic compounds A and B, metal alkoxide X, organic acid Y and organic polymer ZZ, as specified in Table 1, to synthesize a viscous liquid C. The particles specified in Table 1 were dispersed in a solvent S in the amount of 10% by weight to prepare a particle dispersion. This particle dispersion was added to the viscous liquid C which was subsequently stirred and then heat dried at 100° C. to remove the solvent S by evaporation. As a result, a viscous liquid D was obtained. Since the blending proportion of the particle dispersion and viscous liquid C affects a refractive index of the viscous liquid D after cured, it may be properly adjusted to obtain a desired refractive index.

This viscous liquid D was cured by exposure to an ultraviolet radiation. The cured sample was evaluated in the manner as described below. The results are shown in Table 1.

The particles Z specified in Table 1 have the following mean particle size.

$SiO_2$ particles (Example 4: about 20 nm)
$Nb_2O_5$ particles (Example 5: about 10 nm)

COMPARATIVE EXAMPLE 1

The urethane acrylate photocurable resin was used alone.

COMPARATIVE EXAMPLE 2

The procedure of Example 1 was followed, with the exception that the metal alkoxide X and organic acid Y were excluded.

COMPARATIVE EXAMPLE 3

The procedure of Example 1 was followed, with the exception that the metal alkoxide X was excluded.

(Measurement of Transmittance)

The viscous liquid C or D was dripped over a 1 mm thick quartz glass substrate and then cured by exposure to an ultraviolet radiation (365 nm wavelength) to obtain a sample. A thickness of the organometallic polymer material in the form of a coating film was 140 μm.

A spectrophotometer was used to measure a transmittance (%) of the sample in the 400-700 nm range and at 1,550 nm. The measurement results are shown in Table 1.

(Infrared Absorption Spectroscopic Analysis)

The above-obtained samples were subjected to infrared absorption spectroscopic (IR) analysis.

Figure 5:
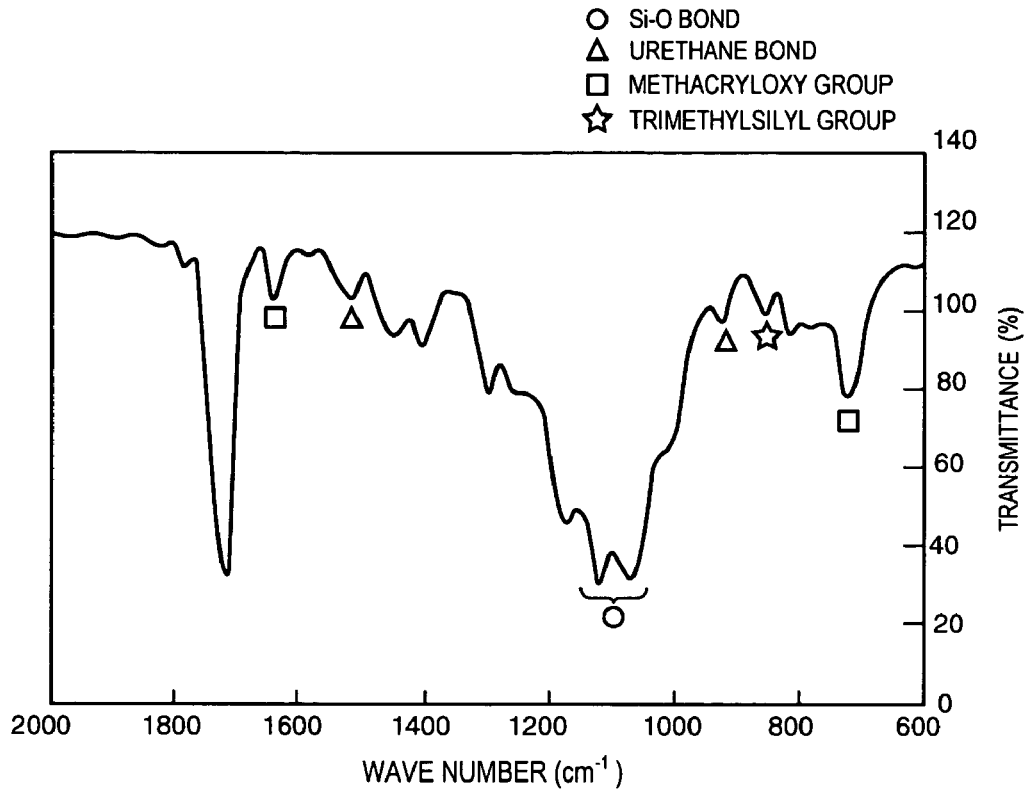
FIG. 5 shows an IR chart for a cured product of the organometallic polymer material in Example 1.

FIG. 5 shows an IR chart for a cured product of the organometallic polymer material obtained in Example 1. As shown in FIG. 5, there appear absorption peaks around 700 $cm^{-1}$ and around 1,650 $cm^{-1}$, both due to the methacryloxy group, and absorption peaks around 900 $cm^{-1}$ and around 1,550 $cm^{-1}$, both due to the urethane bond. Peaks due to the Si—O bond appear in the 1,000-1200 $cm^{-1}$ region. A peak due to the trimethylsilyl group appears around 850 $cm^{-1}$.

Figure 6:
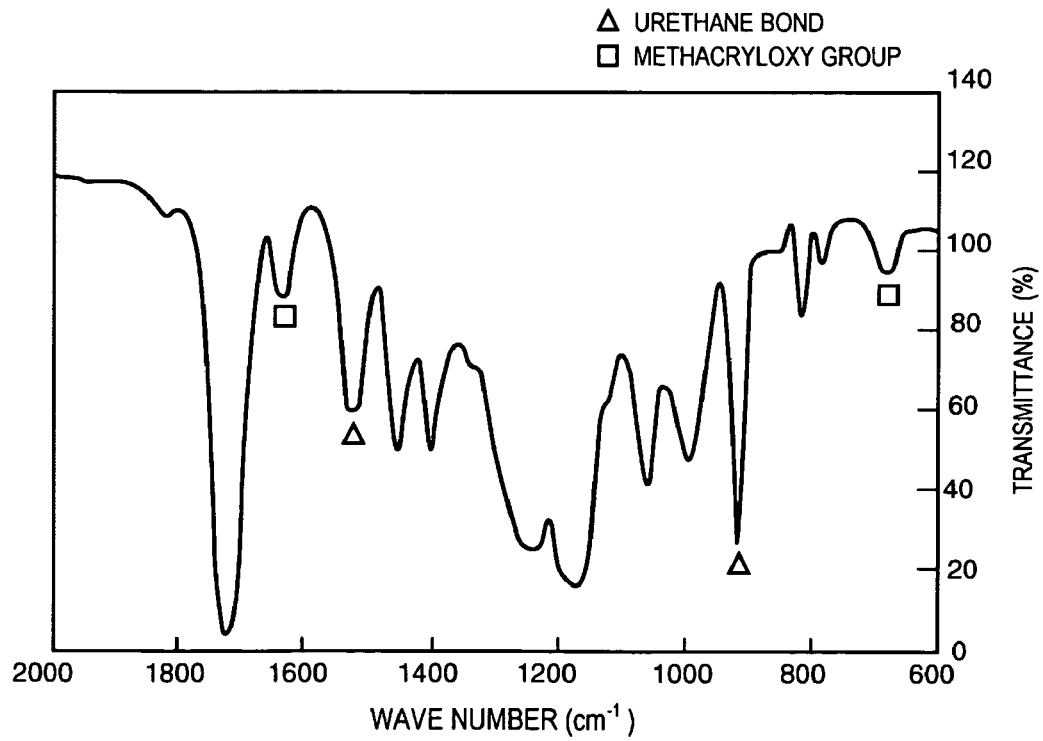
FIG. 6 shows an IR chart for a cured product of the organometallic polymer material in Comparative Example 1.

FIG. 6 shows an IR chart for the cured coating film of Comparative Example 1. As shown in FIG. 6, absorption peaks due to the methacryloxy group and urethane bond are observed. However, a peak due to the trimethylsilyl group is not observed.

Figure 7:
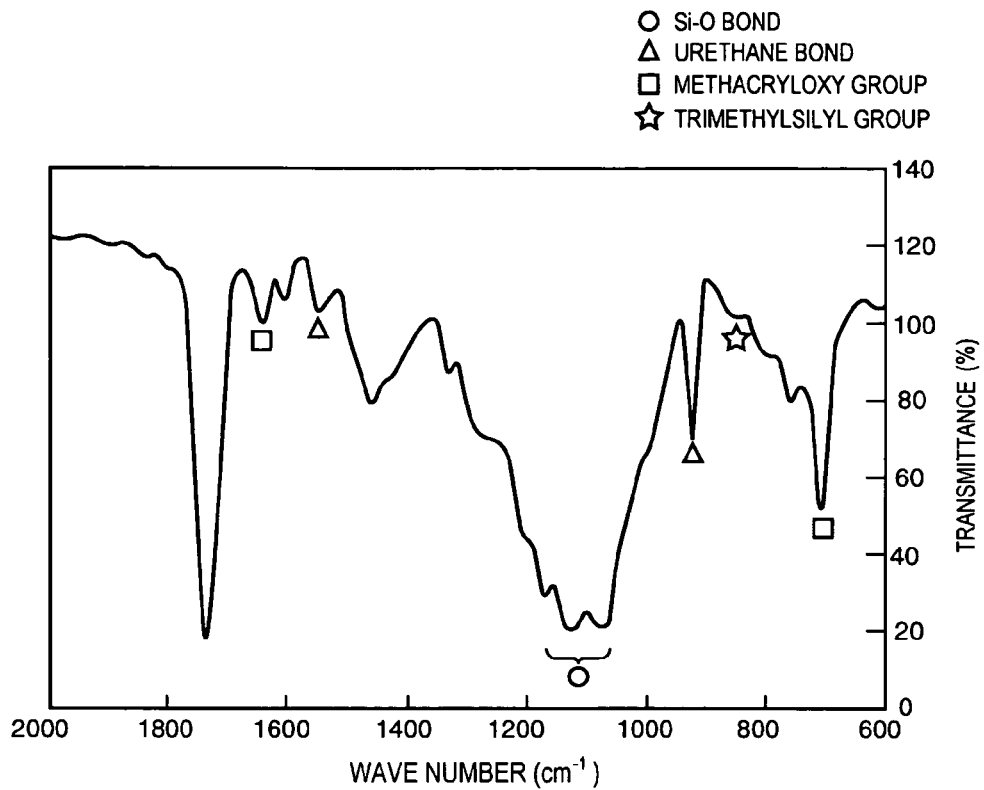
FIG. 7 shows an IR chart for a cured product of the organometallic polymer material in Example 8.

FIG. 7 shows an IR chart for the cured coating film of the organometallic polymer material obtained in Example 8. As shown in FIG. 6, absorption peaks around 700 $cm^{-1}$ and around 1,650 $cm^{-1}$, both due to the methacryloxy group, and absorption peaks around 900 $cm^1$ and around 1,550 $cm^{-1}$, both due to the urethane bond, are observed. Also, peaks in the 1,000-1200 $cm^{-1}$ region, due to the Si—O bond, are observed. Further, a peak due to the trimethylsilyl group is observed around 850 $cm^{-1}$. As shown in FIGS. 5 and 7, the organometallic polymer material of the present invention, after cured, preferably shows an absorption peak around 850

$cm^{-1}$, due to the metal alkoxide. The presence or absence of the absorption peak around 850 $cm^{-1}$ in the IR chart is reported in Table 1 for Examples and Comparative Examples.

The cured product of the organometallic polymer material of the present invention, if the metal atom M is Si, preferably contains a silanol group (Si—OH) such that it shows an IR spectrum in which a ratio, (absorption peak height of the Si—OH bond around 3,400 $cm^{-1}$)/(absorption peak height of the C—H bond around 2,900 $cm^{-1}$), does not exceed 0.2. If this peak ratio does not exceed 0.2, a high transmittance can be obtained. The peak ratio in the IR spectrum is reported below for Examples 1 and 4 and Comparative Example 2.

Example 1: 0.1
Example 4: 0.2
Comparative Example 2: 0.4

Figure 4:
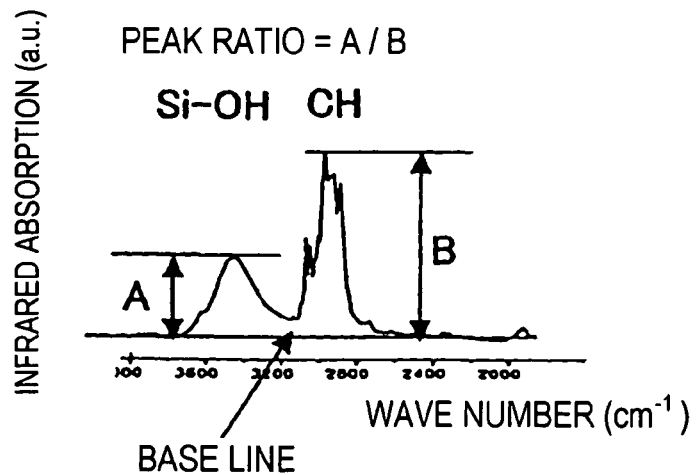
FIG. 4 is an IR chart illustrated to explain a method for measuring a peak ratio A/B.

Each peak ratio is calculated from the peak ratio A/B determined in the fashion shown in FIG. 4.

(Measurement of Refractive Index Change)

Each sample was placed under high-temperature and high-humidity conditions to determine a refractive index change. Specifically, each sample was allowed to stand at 85° C., 85% RH, for 500 hours. Thereafter, its refractive index was measured to calculate the refractive index change. The results are shown in Table 1.

(Measurement of Water Absorption)

A disc-shaped sample was prepared according to JIS K 7209 and its water absorption was measured.

(Measurement of Hardness)

A coating film of each sample was subjected to a pencil hardness test (JIS K 5400). The measurement results are shown in Table 1.

(Measurement of Alkoxide Hydrolysate Residue)

The amount of trimethylsilanol groups present in the coating film of the cured organometallic polymer material was measured. Specifically, the trimethylsilanol groups were separated from the coating film by solvent extraction and the liquid extract was measured by gas chromatography. The measurement results are shown in Table 1.

(Measurement of Transmittance Retention)

Each sample was measured for transmittance change at 1,550 nm with time. Specifically, a transmittance of each sample was measured before and after it was allowed to stand at room temperature for 1,000 hours. The transmittance retention value was calculated from (transmittance after allowed to stand)/(transmittance before allowed to stand)×100 and shown in Table 1.

TABLE 1

| | Synthesizing Process | Organometallic Compound A | Organometallic Compound B | Metal Alkoxide X | Organic Acid Y | Organic Polymer ZZ | Particle Z | Solvents | Water Absorption | Refractive Index Variation After Allowed to Stand at 85° C, 85% RH, for 500 hours | Pencil Hardness (JIS K5400) | Transmittance 400-700 nm | Transmittance 1550 nm | Peak Around 850 cm⁻¹ in the Infrared Absorption Spectroscopic Analysis | Alkoxide Hydrolysate Residue (% by weight) | Transmittance Retention (%) at 1550 nm after Allowed to Stand at Room Temperature for 1,000 hours |
|---|---|---|---|---|---|---|---|---|---|---|---|---|---|---|---|---|
| Ex. 1 | S | 3-methacryloxy-propyl-triethoxysilane | Diphenyldi-methoxysilane | Trimethyl-ethoxysilane | Trifluoroacetic Anhydride | Urethane Acrylate Photocurable Resin | None | None | Less than 1% | 0.0005 | H | At Least 90% | At Least 90% | Present | 1 | 99 |
| Ex. 2 | S | 3-methacryloxy-propyl-triethoxysilane | Pentaethoxy-niobium | Trimethyl-ethoxysilane | Trifluoroacetic Anhydride | Urethane Acrylate Photocurable Resin | None | None | Less than 2% | 0.0005 | H | At Least 90% | At Least 90% | Present | 0.9 | 95 |
| Ex. 3 | S | 3-methacryloxy-propyl-triethoxysilane | Zirconium Isopropoxide | Trimethyl-ethoxysilane | Trifluoroacetic Anhydride | Urethane Acrylate Photocurable Resin | None | None | Less than 2% | 0.0004 | H | At Least 90% | At Least 90% | Present | 0.8 | 96 |
| Ex. 4 | R | 3-methacryloxy-propyl-triethoxysilane | Diphenyldi-methoxysilane | Trimethyl-ethoxysilane | Trifluoroacetic Anhydride | Urethane Acrylate Photocurable Resin | SiO₂ | Ethanol | Less than 1.5% | 0.0008 | 2H | At Least 90% | At Least 90% | Present | 1 | 99 |
| Ex. 5 | R | 3-methacryloxy-propyl-triethoxysilane | Diphenyldi-methoxysilane | Trimethyl-ethoxysilane | Trifluoroacetic Anhydride | Urethane Acrylate Photocurable Resin | Nb₂O₅ | Ethanol | Less than 1.5% | 0.0008 | 2H | At Least 90% | At Least 90% | Present | 1 | 96 |
| Ex. 6 | S | 3-methacryloxy-propyl-triethoxysilane | Diphenyldi-methoxysilane | Trimethyl-ethoxysilane | Trifluoroacetic Anhydride | Polyester Acrylate Photocurable Resin | None | None | Less than 2% | 0.0005 | H | At Least 90% | At Least 90% | Present | 1 | 93 |
| Ex. 7 | S | 3-methacryloxy-propyl-triethoxysilane | Diphenyldi-methoxysilane | Trimethyl-ethoxysilane | Trifluoroacetic Anhydride | Epoxy Acrylate Photocurable Resin | None | None | Less than 1% | 0.0005 | 3H | At Least 90% | At Least 90% | Present | 1 | 93 |
| Ex. 8 | S | 3-methacryloxy-propyl-triethoxysilane | Diphenyldi-methoxysilane | Trimethyl-ethoxysilane | Trifluoroacetic Anhydride | Silicone Acrylate Photocurable Resin | None | None | Less than 1% | 0.0006 | H | At Least 90% | At Least 90% | Present | 1 | 98 |
| Comp. Ex. 1 | | 3-methacryloxy-propyl-triethoxysilane | None | None | None | Urethane Acrylate Photocurable Resin | None | None | Less than 1% | 0.001-0.002 | 2B | At Least 90% | At Least 90% | Absent | None | 98 |
| Comp. Ex. 2 | | None | Diphenyldi-methoxysilane | None | None | Urethane Acrylate Photocurable Resin | None | None | About 2% | 0.002 | H | At Least 90% | 87% | Absent | None | 89 |
| Comp. | | 3-methacryloxy-propyl-triethoxysilane | Diphenyldi- | None | Trifluoroacetic | Urethane | None | None | Less than | 0.001 | H | At Least | At Least | Absent | 0 | 90 |

TABLE 1-continued

| Synthesizing Process | Organometallic Compound A | Organometallic Compound B | Metal Alkoxide X | Organic Acid Y | Organic Polymer ZZ | Particle Z | Solvent S | Water Absorption | Refractive Index Variation After Allowed to Stand at 85° C. 85% RH, for 500 hours | Pencil Hardness (JIS K5400) | Transmittance 400-700 nm | Transmittance 1550 nm | Peak Around 850 cm$^{-1}$ in the Infrared Absorption Spectroscopic Analysis | Alkoxide Hydrolysate Residue (% by weight) | Transmittance Retention (%) at 1550 nm after Allowed to Stand at Room Temperature for 1,000 hours |
|---|---|---|---|---|---|---|---|---|---|---|---|---|---|---|---|
| Ex. 3 | propyltriethoxysilane | methoxysilane | | Anhydride | Acrylate Photocurable Resin | | | 1% | | | 90% | 90% | | | |

As shown in Table 1, the products obtained via curing of the organometallic polymer materials of Examples 1-8 in accordance with the present invention show smaller refractive index changes and thus improved reliability at high temperature and high humidity, compared to those of Comparative Examples 1-3. Also, the coating films are comparable or higher in hardness. Further, they show higher transmittance retention values even after allowed to stand at room temperature for an extended period of time, compared to that of Comparative Example 2.

While a refractive index of the cured product of the organometallic polymer material of Example 1 was 1.52, that of Example 4 was successfully set at 1.51 by controlling the blending proportion of the particle dispersion and the viscous liquid C in the process R. Likewise, that of Example 5 was successfully set at 1.59 by controlling the blending proportion of the particle dispersion and the viscous liquid C in the process R. The refractive index was measured at 630 nm.

As evident from these results, the refractive index can be controlled by adding fine particles. The refractive index value can be increased by adding $Nb_2O_5$ particles or reduced by adding $SiO_2$ particles.

EXAMPLE 9

A composite aspherical lens was fabricated using the viscous liquid C in Example 1. The composite aspherical lens refers to an aspherical lens which uses, as a base material, a spherical lens or flat plate made of glass or resin and has an aspherical resin layer formed on an optical plane of the base material.

As shown in FIG. 1(a), a viscous liquid 11 was dripped onto a glass spherical lens 10 (base glass) having a diameter of 5 mm and a maximum thickness of 1 mm. This viscous liquid 11 was the viscous liquid C in Example 1. Next, a nickel mold 12 having an inner aspherical surface was pressed against the viscous liquid 11 on the glass spherical lens 10, as shown in FIG. 1(b). The viscous liquid 11 was then exposed through the glass spherical lens 10 to an ultraviolet radiation 14 so that the viscous liquid 11 was cured to form a resin layer 13 comprised of an organometallic polymer material, as shown in FIG. 1(c).

The mold 12 was subsequently moved away, as shown in FIG. 1(d), to obtain a composite aspherical lens 15 having the glass spherical lens 10 and the resin layer 13, as shown in FIG. 1(e).

Figure 2:
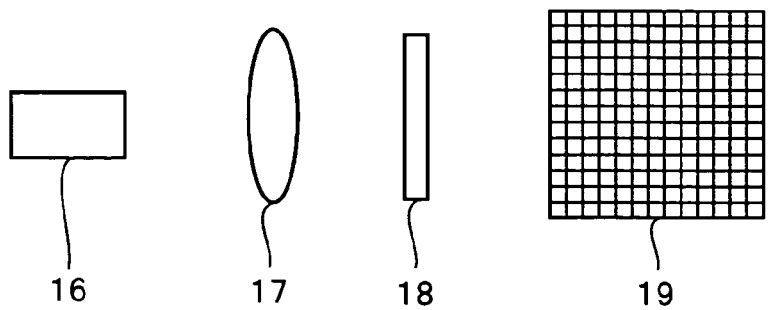
FIG. 2 is a schematic view, illustrating a device for measuring a spherical aberration of a composite aspherical lens.

Next, the equipment shown in FIG. 2 was utilized to observe spherical aberration for the composite aspherical lens and the spherical lens without the resin layer. A lens 17 was located between a screen 18 having a mesh pattern thereon and a CCD camera 16. A magnified image of the mesh pattern on the screen 18 was observed using the CCD camera 16. This mesh pattern on the screen 18 is shown in FIG. 2 to be a mesh pattern 19 having a 0.5 nm interval.

Figure 3:
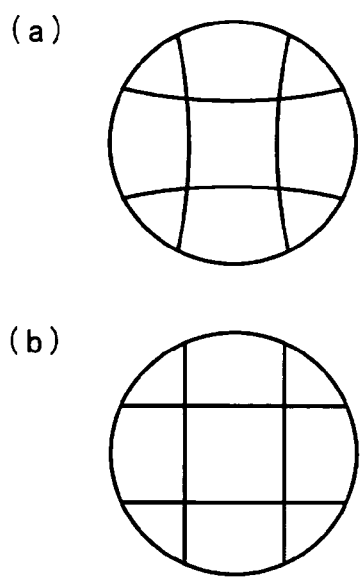
FIG. 3 illustrates mesh pattern images when observed using a glass spherical lens and a composite aspherical lens.

When the glass spherical lens 10 was used in the place of the lens 17, a distorted image of the mesh pattern due to spherical aberration unique to the spherical lens, as shown in FIG. 3(b), was observed. On the other hand, when the above-fabricated composite aspherical lens 15 was used in the place of the lens 17, a magnified true image of the mesh pattern was obtained, as shown in FIG. 3(a).

The same results were obtained when the viscous liquids in Examples other than Example 1 were used to fabricate composite aspherical lenses.

EXAMPLE 10

Investigation of Relation between $SiO_2$ Particle Size and Transmittance

Samples of $SiO_2$ particles having differing particle sizes were prepared according to the following procedure.

Tetraethoxysilane was diluted with an ethanol solvent. Ammonia water was added to effect hydrolytic polycondensation to prepare samples of $SiO_2$ particles, during which time the pH value and the alkoxysilane concentration were varied to control the particle sizes of the resulting samples of $SiO_2$ particles. Specifically, samples of $SiO_2$ particles were obtained having the following 8 different particle sizes; 10 nm, 30 nm, 50 nm, 80 nm, 100 nm, 200 nm, 400 nm and 1,000 nm. Preparation of such samples of $SiO_2$ particles is disclosed, for example, in Applied Optics, vol. 25, No. 9, pp. 1481 (1986).

Each sample of $SiO_2$ particles was incorporated in the organometallic polymer material of Example 1 in the amount of 10% by weight and then exposed to an ultraviolet radiation in the same manner as in Example 1. A transmittance of each sample obtained is shown in FIG. 8.

Figure 8:
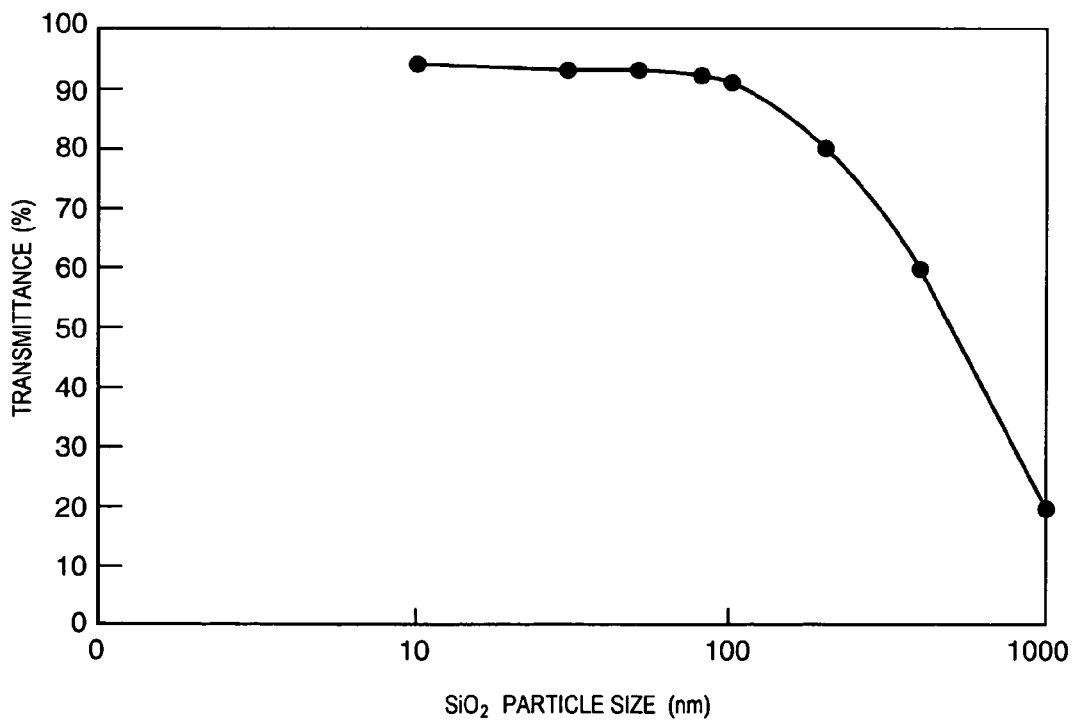
FIG. 8 is a graph showing a relationship between the transmittance of the organometallic polymer material of the present invention and the size of $SiO_2$ particles incorporated therein.

As shown in FIG. 8, a transmittance increases with a decreasing particle size of $SiO_2$ particles. A transmittance is high particularly when the particle size is reduced to 100 nm and below.

EXAMPLE 11

Investigation of Relation of Difference in Refractive Index of Organometallic Polymer and Organic Polymer to Transmittance In Example 1, the viscous liquid B alone was UV cured to obtain a cured product of the organometallic polymer. The organic polymer ZZ alone was UV cured to obtain a cured product thereof (refractive index 1.52). A difference in refractive index between them was then determined to investigate a relation between refractive index difference and transmittance.

The refractive index of the cured product of the viscous liquid B was adjusted by varying the blending proportion of the organometallic compounds A and B.

Each sample had a 140 µm thick coating film and its transmittance was measured at a wavelength of 630 nm. The measurement results are shown in Table 2.

TABLE 2

| | | | | |
|---|---|---|---|---|
| Refractive Index of Cured Product Resulted from UV Curing of Viscous Liquid B Alone | 1.525 | 1.53 | 1.54 | 1.55 |
| Refractive Index Difference | 0.005 | 0.01 | 0.02 | 0.03 |
| Transmittance | At Least 90% | At Least 90% | 80% | 60% |

As can be clearly seen from the results shown in Table 2, the transmittance is maintained at a high value if the difference in refractive index between the respective cured products of the organometallic polymer and the organic polymer does not exceed 0.01.

EXAMPLE 12

Discussion on Antireflection Coating

Since the organometallic polymer material of the present invention contains both inorganic and organic compounds, as described above, it shows good adherence to both inorganic and organic surfaces. The antireflection coatings are known to include inorganic and organic antireflection coatings. The inorganic antireflection coating is applied by a dry process such as a sputtering or vacuum deposition process. The organic antireflection coating is applied by a wet process such as a coating process. Since the organometallic polymer material of the present invention shows good adherence to both inorganics and organics, as described above, it can be firmly adhered to both inorganic and organic antireflection coatings.

Accordingly, an inorganic or organic coating can adhere firmly to the underlying light transmissive region formed from the organometallic polymer material of the present invention. The application of an $SiO_2$/titanium oxide antireflection coating is particularly preferred. Examples of titanium oxides include $TiO_2$ and $Ti_2O_3$.

An $SiO_2$/titanium oxide antireflection coating was applied onto the composite aspherical lens made in Example 9. First, an about 0.1 µm thick $SiO_2$ layer having a good affinity for a cured coating film of the organometallic polymer material was formed to serve as an underlayer. Then, an antireflection coating consisting of four superimposed layers of the titanium oxide layer ($Ti_2O_3$ layer)/$SiO_2$ layer was applied.

The following testing methods (1)-(4) were utilized to evaluate reliability of the composite aspherical lens carrying the antireflection coating thereon.

(1) High-temperature and high-humidity test: the lens was allowed to stand at 85° C., 85% RH, for 500 hours.

(2) Thermal cycle test: the lens was cycled between −45° C. and 85° C. for 100 cycles.

(3) Low-temperature test: the lens was allowed to stand at −45° C. for 500 hours.

(4) High-temperature test: the lens was allowed to stand at 85' for 500 hours.

In all tests, neither whitening of the resin layer nor separation of the antireflection coating nor development of cracks was observed. These testing results demonstrate high reliability.

Figure 9:
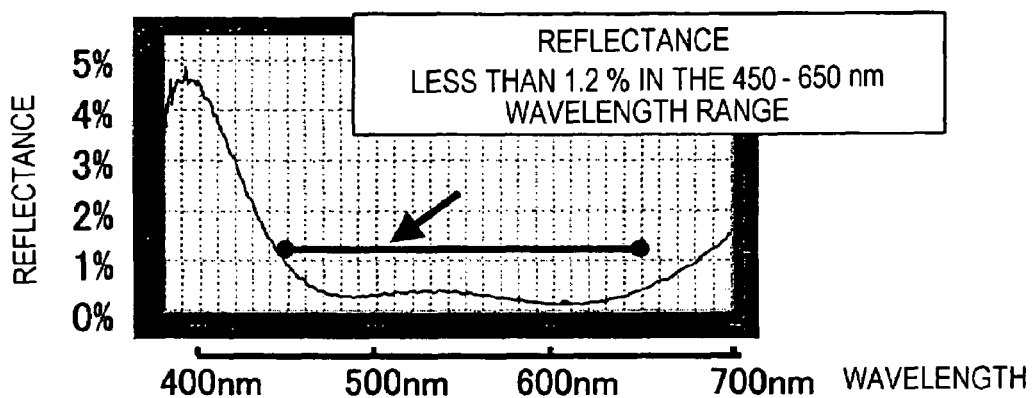
FIG. 9 is a graph showing the reflectance after a high-temperature and high-humidity test.

FIG. 9 shows a reflectance of the lens after subjected to the above high-temperature and high-humidity test (1). As shown in FIG. 9, the lens exhibits a good reflectance even after the high-temperature and high-humidity test.

For comparative purposes, the materials of Comparative Examples 1 and 2 were used to form the resin layer. The former resulted in the separation of the antireflection coating and the latter resulted in the occurrence of whitening.

EXAMPLE 13

Use of High-Refractive Transmissive Ceramic Base

The procedure of Example 9 was followed, except that a high-refractive transmissive ceramic (refractive index: about 2.1) was used as the base material, to fabricate a composite aspherical lens.

Evaluation of the composite aspherical lens resulted in obtaining a magnified true image of the mesh pattern, as similar to Example 9.

EXAMPLES 14-17 AND COMPARATIVE EXAMPLE 4

Organometallic polymer materials were synthesized by the following process T.

(Process T)

(1) 15.3 ml of the organometallic compound A and 6.34 ml of the organometallic compound B were added to 31.6 g of ethanol. 3.8 ml of 2N hydrochloric acid as a reaction catalyst was further added. The resulting mixture was stirred sufficiently and then allowed to stand at room temperature for 78 hours to effect hydrolysis and polycondensation.

(2) 5 ml of a solution of the polycondensate obtained was introduced in a laboratory dish. 10 mg of 1-hydroxy-cyclohexyl-phenyl-ketone as a polymerization initiator was dissolved. The resultant was heated at 100° C., so that a viscous liquid E, weighing about 1 g, was obtained.

(3) 1 ml of the organic acid Y specified in Table 3 was added to the viscous liquid E. The resultant was allowed to stand at room temperature for 23 hours and then heated to 105° C. to remove excess organic acid Y. As a result, a viscous liquid F was obtained.

(4) 3.75 ml of the metal alkoxide X specified in Table 3 was added to the viscous liquid F. The resultant was allowed to stand at room temperature for 72 hours and then heated to 110° C. to remove an excess portion of the metal alkoxide X by evaporation. As a result, a viscous liquid G was obtained.

(5) In Examples 14, 16 and 17, 3 ml of the solvent S specified in Table 3 was dissolved in the viscous liquid F. 2 ml of purified water was added. The resultant was separated into 2 layers by stirring. Thereafter, the upper layer alone was taken in a laboratory dish and then heated to 110° C. to remove the solvent S. As a result, a viscous liquid H was obtained.

(6) The organic polymer ZZ specified in Table 3 was added to 0.55 g of the viscous liquid H. The resultant was stirred to obtain a viscous liquid I.

(7) This viscous liquid I was interposed, through a 140 µm thick gap material, between two glass plates and then UV cured to obtain a cured sample (about 140 µm thick) which was subsequently evaluated. The results are shown in Table 3.

Its water absorption was measured in the same fashion as described above.

An $SiO_2$/titanium oxide antireflection coating was applied onto a cured coating film of the organometallic polymer material to judge whether or not the antireflection coating was successfully formed. The rating "successful" indicates that the antireflection coating is successfully formed.

The antireflection coating, after application, was allowed to stand at 60° C., 90% relative humidity, for 500 hours or at 85° C., 85% relative humidity, for 500 hours. Its surface condition was then visually observed to make an evaluation.

The evaluation results for the organometallic polymer materials of Example 1 and Comparative Examples 1 and 2 are also shown in Table 3.

TABLE 3

| | Synthesizing Process | Organometallic Compound A | Organometallic Compound B | Metal Alkoxide X | Organic Acid Y | Organic Polymer ZZ |
|---|---|---|---|---|---|---|
| Ex. 1 | S | 3-methacryloxy-propyl-triethoxysilane | Diphenyldi-methoxysilane | Trimethyl-ethoxysilane | Trifluoroacetic Anhydride | Urethane Acrylate Photocurable Resin |
| Ex. 14 | T | 3-methacryloxy-propyl-triethoxysilane | Diphenyldi-methoxysilane | Trimethyl-ethoxysilane | Trifluoroacetic Anhydride | Urethane Acrylate Photocurable Resin |
| Ex. 15 | T | 3-methacryloxy-propyl-triethoxysilane | Phenyltri-ethoxysilane | Trimethyl-ethoxysilane | Trifluoroacetic Anhydride | Urethane Acrylate Photocurable Resin |
| Ex. 16 | T | 3-methacryloxy-propyl-triethoxysilane | Phenyltri-ethoxysilane | Trimethyl-ethoxysilane | Trifluoroacetic Anhydride | Urethane Acrylate Photocurable Resin |
| Ex. 17 | T | 3-methacryloxy-propyl-triethoxysilane | Diphenyldi-methoxysilane | Trimethyl-ethoxysilane | Trifluoroacetic Anhydride | Urethane Acrylate Photocurable Resin |
| Comp. Ex. 1 | | None | None | None | None | Urethane Acrylate Photocurable Resin |
| Comp. Ex. 2 | S | 3-methacryloxy-propyl-triethoxysilane | Diphenyldi-methoxysilane | None | None | Urethane Acrylate Photocurable Resin |
| Comp. Ex. 3 | S | 3-methacryloxy-propyl-triethoxysilane | Phenyltri-ethoxysilane | None | None | Urethane Acrylate Photocurable Resin |

| | Solvent S | Water Absorption | Application of Antireflection Coating | Surface Condition After Application of Antireflection Coating and After Allowed to Stand at 60° C., 90% RH, for 500 hours | Surface Condition After Application of Antireflection Coating and After Allowed to Stand at 85° C., 85% RH, for 500 hours |
|---|---|---|---|---|---|
| Ex. 1 | | Less than 1% | Successful | Remained Unchanged | Remained Unchanged |
| Ex. 14 | Trimethyl-ethoxysilane | Less than 0.5% | Successful | Remained Unchanged | Remained Unchanged |
| Ex. 15 | None | Less than 1% | Successful | Remained Unchanged | Remained Unchanged |
| Ex. 16 | Trimethyl-ethoxysilane | Less than 0.5% | Successful | Remained Unchanged | Remained Unchanged |
| Ex. 17 | N-hexane | Less than 0.5% | Successful | Remained Unchanged | Remained Unchanged |
| Comp. Ex. 1 | | Less than 1% | Successful | Remained Unchanged | Separation Occurred for Antireflection Coating |
| Comp. Ex. 2 | | About 2% | Successful | Whitening Occurred | Whitening Occurred |
| Comp. Ex. 3 | | About 2% | Successful | Whitening Occurred | Whitening Occurred |

As indicated in Table 3, a surface condition of the antireflection coating remained unchanged after both the test at 60° C. and the test at 85° C., for the organometallic polymer materials of Examples 1 and 14-17 in accordance with the present invention. On the other hand, for the material of Comparative Example 1 using the urethane acrylate photocurable resin alone, separation of the antireflection coating occurred in the test at 85° C. For the organometallic polymer materials of Comparative Examples 2 and 4 excluding the metal alkoxide X and organic acid Y, whitening occurred in both the test at 60° C. and the test at 85° C.

As can be appreciated, the organometallic polymer materials of Examples 14, 16 and 17 with rinsing are lower in water absorption than those of Examples 1 and 15 without rinsing. Accordingly, application of rinsing is found to successfully reduce the water absorption.

EXAMPLE 18

In the preceding process T, an acrylate resin from Norland Products, Inc. (product name "NOA 65") was used as the organic polymer ZZ. The relation of a refractive index of the viscous liquid H (prior to addition of the organic polymer ZZ) and that of the organic polymer ZZ was investigated.

The refractive index of the viscous liquid H prior to addition of the organic polymer ZZ, both in a liquid form before it was cured and in a solid form after it was cured, was measured. Also, the refractive index of the organic polymer ZZ (i.e., NOA 65), both in a liquid form before it was cured and in a solid form after it was cured, was measured. Their refractive indexes were measured using an Abbe refractometer with a passing light at 589 nm. The refractive index (nD) measurement results are shown in Table 4.

TABLE 4

| | Liquid Form before Cure | Solid Form after Cure |
|---|---|---|
| Viscous Solution H | 1.51 | 1.53 |
| NOA65 | 1.50 | 1.52 |

As shown in Table 5, the blending proportion of the organometallic compounds A and B was varied to obtain viscous liquids having different refractive indexes. A difference in refractive index between each viscous liquid before cured and the organic polymer ZZ, as well as a transmittance of a cured product of each liquid subsequent to addition of the organic polymer ZZ (i.e., the viscous liquid I), were measured and their relation was investigated.

Each sample of coating film was 140 μm thick. Its transmittance was measured at a wavelength of 630 nm. The measurement results are shown in Table 5.

TABLE 5

| Organometallic Compound A (ml) | 15.8 | 15.3 | 14.1 | 13.3 | 11.6 |
|---|---|---|---|---|---|
| Organometaltic Compound B (ml) | 5.8 | 6.34 | 7.5 | 8.4 | 10.1 |
| Refractive Index Differential from NOA65 (Liquid Form before Cure) | 0.005 | 0.01 | 0.015 | 0.02 | 0.03 |
| Transmittance | At Least 90% | At Least 90% | At Least 90% | At Least 90% | 70% Level |

As can be clearly seen from the results shown in Table 5, the material after cured exhibits a high transmittance, if the difference in refractive index between the material in the liquid form before it is cured and the organic polymer ZZ is kept within 0.02.

The water absorption, refractive index change and hardness of each cured product of the viscous liquid I were measured in the same manner as described above. They all exhibited a water absorption of not exceeding 1%, a refractive index change of not exceeding 0.0005 and a pencil hardness of H.

An antireflection coating was applied onto each cured product in the same manner as described above. The resulting composite aspherical lenses were evaluated for reliability in the same manner as described above. In all the tests including the high-temperature and high-humidity test (1), thermal cycle test (2), low-temperature test (3) and high-temperature test (4), neither whitening of the resin layer nor separation of the antireflection coating nor development of cracks was observed to assure high reliability.

Each antireflection coating, after application, was subjected to the same thermal tests as described above. Neither of them showed a change in surface condition. However, separation of the antireflection coating was observed in the test at 85° C. for the comparative cured product using NOA-65 alone.

Measurement of a volumetric cure shrinkage factor revealed 6-7% for each material and 7-10% for the comparative cured product using NOA-65 alone.

EXAMPLE 19

Organometallic polymer materials were synthesized by the following process U.

(Process U)

In the preceding process T, the types of the organometallic compounds A and B were altered as follows.

Organometallic compound A: 3-methacryloxypropyl-trimethoxysilane (MPTMS)

Organometallic compound B: phenyltrimethoxysilane (PhTMS)

While using NOA-65 as the organic polymer, the blending proportion of MPTMS and PhTMS was varied to vary a water absorption of the final cured product. The measurement results are shown in Table 10. In Table 10, a series of ● indicate water absorption data for a cured product of the viscous liquid I and a series of A indicate those for a cured product of the viscous liquid E that was prepared without the practice of the processes (3)-(6) in the process T.

The blending proportion of MPTMS and PhTMS was varied to 15.7% by weight, 39.0% by weight and 50.4% by weight, in terms of a PhTMS content.

Figure 10:
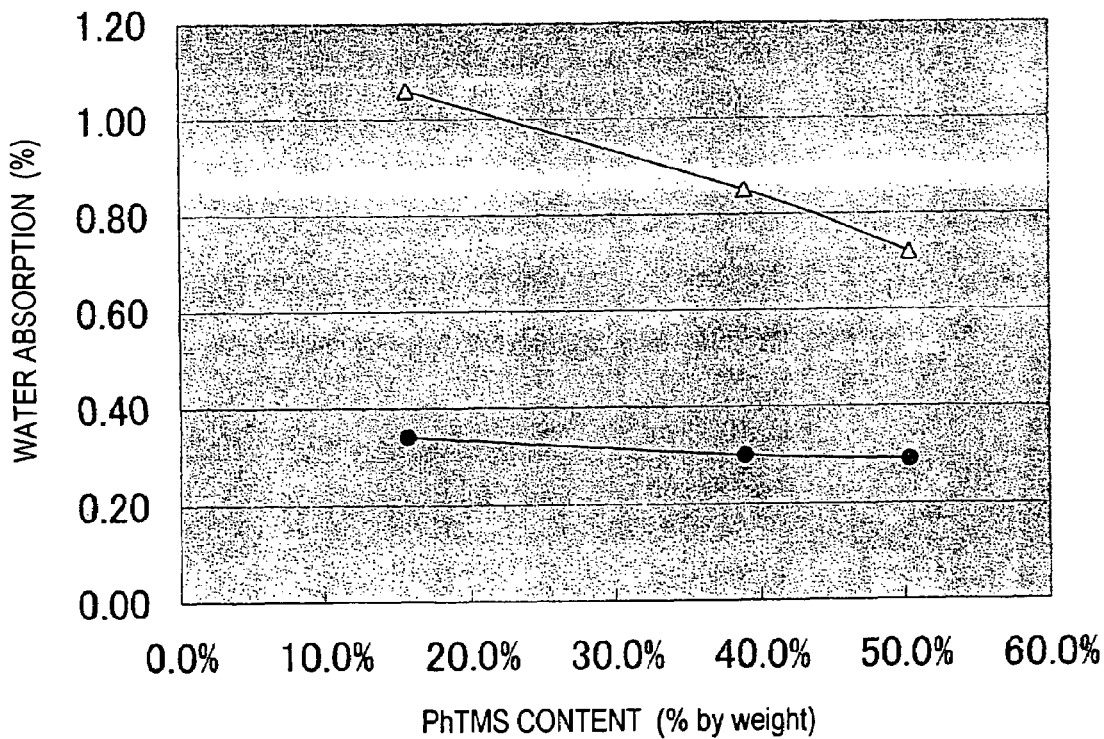
FIG. 10 is a graph showing the water absorption of the organometallic polymer material that varies with the blending proportion of the organometallic compounds A and B.

As can be clearly seen from FIG. 10, even in the case where the refractive index value is varied by varying the blending proportion of the organometallic compounds A and B, the addition of the organic acid Y and metal alkoxide X, in accordance with this invention, results in the successful reduction of a water absorption of the organometallic polymer material.

The water absorption, refractive index change and hardness of each organometallic polymer material were measured in the same manner as described above. They all exhibited a water absorption of not exceeding 1%, a refractive index change of not exceeding 0.0005 and a pencil hardness of H.

The same results were obtained when an antireflection coating was applied onto each polymer material and evaluated in the same manner as described above.

The volumetric cure shrinkage factor of each polymer material was measured in the same manner as described above and, as a result, found to be 6-7%.

(Heat Resistance Evaluation)

The materials of Example 1, Example 14 and Comparative Example 1 were evaluated for heat resistance (heat distortion temperature). Measurement was made using a thermomechanical analyzer TMA-50, manufactured by Shimadzu Corporation. A 50 gf load was applied by an indent needle to a surface of each sample while its temperature was increased. A temperature at which the softened sample permitted penetration of the indent needle was recorded as a heat distortion temperature. The heat distortion temperatures of the materials of Examples 1 and 14 were about 130° C., while that of the material of Comparative Example 1 was about 50-60° C. This demonstrates the improved heat resistance of the materials of Examples 1 and 14.

EXAMPLES 20-22

The procedure of Example 1 was followed, except that the urethane acrylate photocurable resin as the organic polymer ZZ was replaced by the resin specified below, to prepare the viscous liquid C.

EXAMPLE 20

As the organic polymer ZZ, a resin was used containing 56% by weight of (A) urethane acrylate (product of Nippon Soda Co., Ltd., product name "TEA-1000") consisting of polybutadiene glycol, tolylene diisocyanate and 2-hydroxyethyl acrylate, 25% by weight of (B) pentaerithritol triacrylate as polyfunctional acrylate, 17% by weight of (C) benzyl methacrylate as monofunctional methacrylate, and 2% by weight of (D) 1-hydroxycyclohexylphenylketone as a photopolymerization initiator.

EXAMPLE 21

As the organic polymer ZZ, a resin was used containing 56% by weight of (A) urethane methacrylate (product of Nippon Soda Co., Ltd., product name "TE-2000") consisting of polybutadiene glycol, tolylene diisocyanate and 2-hydroxyethyl methacrylate, 25% by weight of (B) pentaerithritol triacrylate as poly-functional acrylate, 17% by weight of (C) benzyl methacrylate as monofunctional methacrylate, and 2% by weight of (D) 1-hydroxycyclohexylphenylketone as a photopolymerization initiator.

EXAMPLE 22

As the organic polymer ZZ, a resin was used containing 56% by weight of (A) urethane acrylate (product of Nippon Soda Co., Ltd., product name "TEAI-1000") consisting of polybutadiene glycol with unsaturated double bonds having been hydrogenated, tolylene diisocyanate and 2-hydroxyethyl acrylate, 25% by weight of (B) pentaerithritol triacrylate as poly functional acrylate, 17% by weight of (C) benzyl methacrylate as monofunctional methacrylate, and 2% by weight of (D) 1-hydroxycyclohexylphenylketone as a photopolymerization initiator.

"TEA-1000" and "TE-2000" are a urethane acrylate polymer and a urethane methacrylate polymer, each having the following structure, respectively. $R_2$ in the structure represents H for "TEA-1000" and $CH_3$ for "TE-2000".

[CHEMICAL 2]

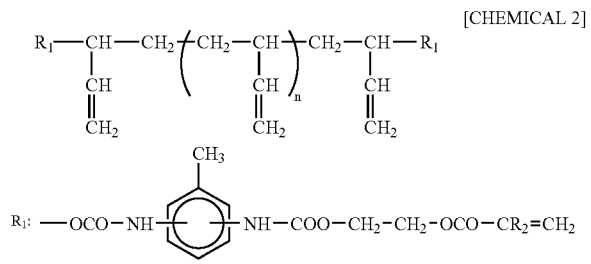

"TEAI-1000" has the following structure.

[CHEMICAL 3]

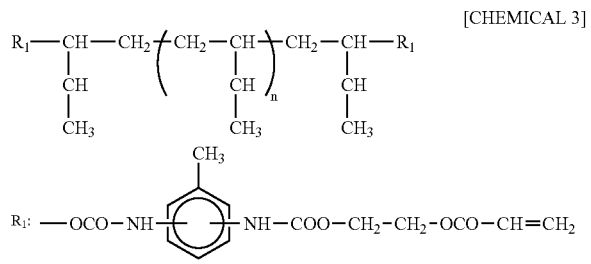

EXAMPLE 23

In Example 9, the viscous liquid C in Example 1 was replaced by the viscous liquid C in Example 20. Otherwise, the procedure of Example 9 was followed to fabricate a composite aspherical lens.

EXAMPLE 24

In Example 12, an antireflection coating was applied onto the composite aspherical lens fabricated in Example 23, instead of that fabricated in Example 9, and then evaluated according to the testing methods (1)-(4), as similar in manner to Example 12. In all tests, neither whitening of the resin layer nor separation of the antireflection coating nor development of cracks was observed. These testing results demonstrate high reliability.

EXAMPLE 25

The procedure of Example 23 was followed, except that the high-refractive glass (product of Ohara Inc., product name "S-LAH79", refractive index of about 2.0) was used as the base material, to fabricate a composite aspherical lens.

Evaluation of the obtained composite aspherical lens resulted in obtaining a magnified true image of the mesh pattern, as similar to Example 9.

The same results were obtained when the other Ohara products "S—NPH1" (refractive index of about 1.81), "S—NPH2" (refractive index of about 1.92), "S-TIH53" (refractive index of about 1.85), "S-TIH6" (refractive index of about 1.80) and "S-LAL7" (refractive index of about 1.65) were used as the high-refractive glass.

EXAMPLE 26

Figure 11:
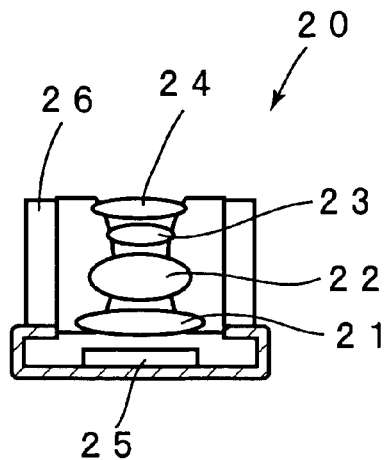
FIG. 11 is a sectional view, illustrating an embodiment of a camera module in accordance with the present invention.

FIG. 11 is a sectional view which shows an embodiment of a camera module in accordance with the present invention. As shown in FIG. 11, four aspherical lenses 21, 22, 23 and 24 are located above an image pickup element 25. These aspherical lenses are held in positions by an auto-focus mechanism 26. A camera module 20 having those four aspherical lenses 21-24 can be used as a 2-5 megapixel camera module for a portable telephone.

In this Example, the aspherical lens in Example 25 was used for the aspherical lenses 21-24. Since the aspherical lens of Example 25 uses the high-refractive base material having a refractive index of about 2.0, as described above, a focal length can be reduced. Accordingly, the camera module in this Example can be reduced in height to about 8 mm.

From standpoints of low expansion and high reliability, conventional camera modules for portable telephones use a glass mold aspherical lens made by heating glass to a high temperature and then performing molding thereof. However, the glass mold aspherical lens limits the types of useful glass materials to those processable on molding equipment and thus has a maximum refractive index of about 1.8. This is why conventional camera modules have a height of about 10 mm.

Figure 12:
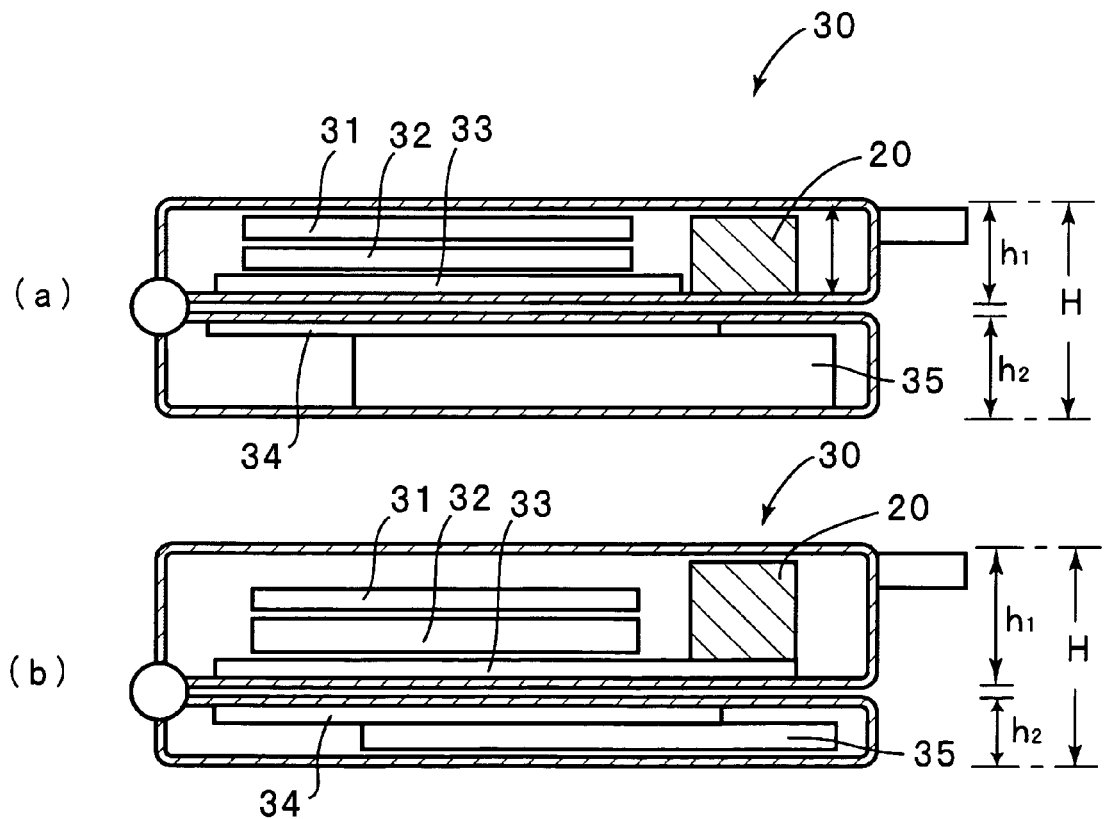
FIG. 12 is a schematic sectional view, showing a potable phone provided with a conventional camera module.

FIG. 12 is a sectional view, illustrating a folding portable telephone incorporating a conventional camera module which measures 10 mm in height.

As shown in FIGS. 12(a) and 12(b), the portable telephone in a folded position has a height H of 25 mm. In the portable telephone shown in FIG. 12(a), a height $h_1$ of its upper section is 12.5 mm and equal to a height $h_2$ of its lower section. The upper section has a camera module 20. A TV tuner 31, a hard disk drive 32 and a display 33 are located inside the upper section. In FIG. 12(a), the upper section has a relatively small height $h_1$ of 12.5 mm. Accordingly, the camera module 20 limits an available space for the display 33 which is thus forced to reduce in size. A keyboard 34 and a battery 35 are located inside the lower section.

In the portable telephone shown in FIG. 12(b), the upper section has a height $h_1$ of 14.5 mm and the lower section has a height $h_2$ of 10.5 mm. This design contemplates to increase the height $h_1$ of the upper section for accommodation of the display 33 of a larger size. On the other hand, the height $h_2$ of the lower section is reduced to 10.5 mm. This forces a reduction in volume of the battery 35 and accordingly a battery capacity, which has been a problem.

Figure 13:
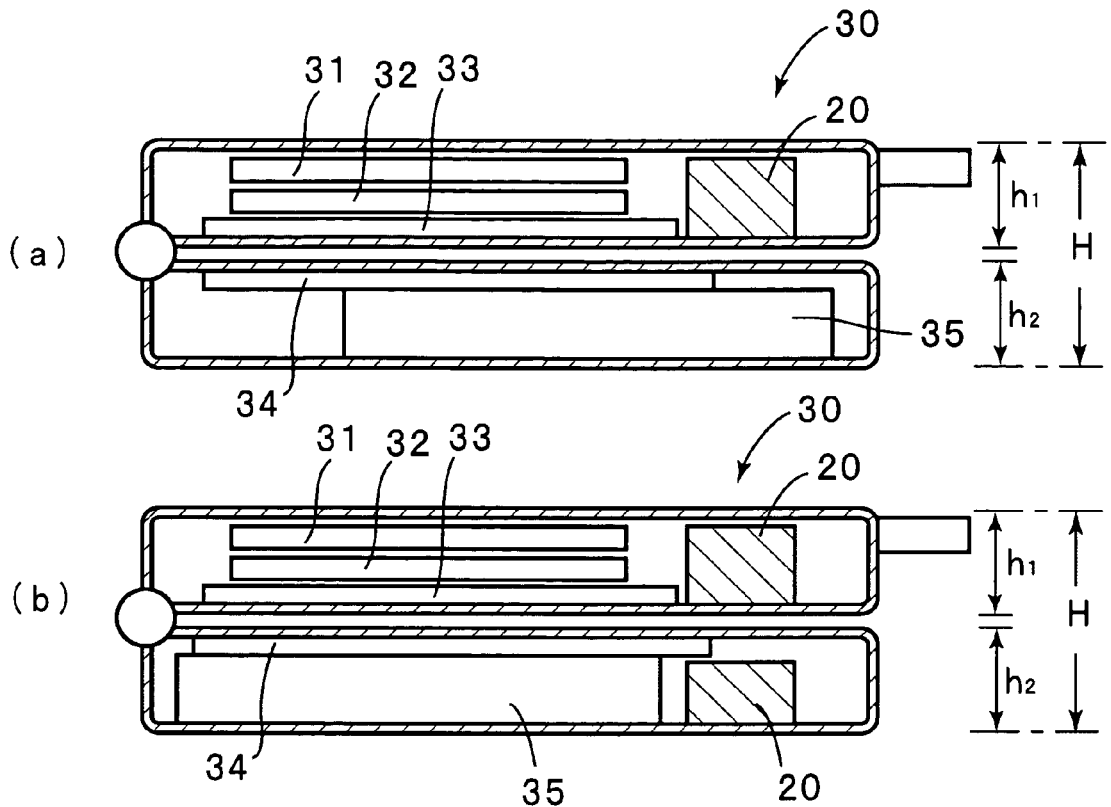
FIG. 13 is a schematic sectional view, showing an embodiment of a potable phone in accordance with the present invention, when incorporating an embodiment of a camera module in accordance with the present invention.

FIG. 13 is a sectional view which illustrates an embodiment of a portable telephone in accordance with the present invention. The camera module 20 of the present invention is located inside the portable telephone shown in FIGS. 13(a) and 13(b). Since the camera module 20 of the present invention can be reduced in height, for example, to about 8 mm, it permits accommodation of a large-size display 33 within the upper section even if its height $h_1$ is not increased, as shown in FIG. 13(a), and thus allows the lower section and the upper section to have the same height $h_2$ and $h_1$ of 12.5, which permits accommodation of the battery 35 of a larger capacity.

It also allows the camera module 20 to be located inside each of the upper and lower sections, as shown in FIG. 13(b). This enables one to photograph a stereoscopic visual image or its own face with a high image quality. Other applications become possible. For example, panoramic shooting can be achieved by using plural cameras. Also, the sensitivity can be substantially improved by electrically composing output signals from plural cameras.

EXAMPLE 27

The camera module shown in FIG. 11 is also useful as a camera module of a back monitor for use in cars. The back monitor for use in cars requires high heat resistance. The aspherical lens of Example 25 meets this requirement and also widens an angle of visual field due to its high refractive index.

EXAMPLE 28

Since the organometallic polymer material of the present invention is highly reliable, as demonstrated in Example 12, it is useful for intraboard and interboard connections in various electronic devices and can be applied to optical waveguide devices.

Figure 14:
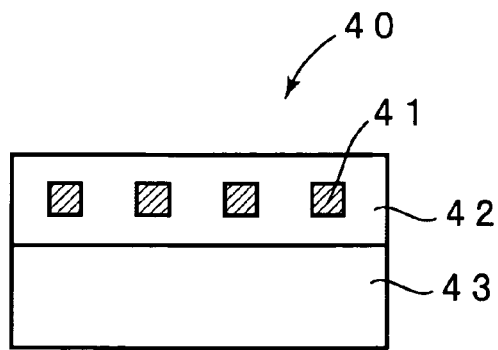
FIG. 14 is a sectional view, illustrating an embodiment of an optical waveguide in accordance with the present invention.

FIG. 14 is a sectional view which illustrates an embodiment of an optical waveguide in accordance with the present invention. As shown in FIG. 14, a cladding layer 42 is provided on a glass substrate 43. Core layers 41 are formed inside the cladding layer 42. Those core layers 41 measure about 70 μm in height and are arranged at intervals of about 500 μm. The cladding layer 42 has an about 100 μm thick upper portion overlying the core layers 41 and an about 100 μm thick lower portion underlying the core layers 41.

In this Example, the core layers 41 are formed of a photo-cured solid product of the organometallic polymer material of Example 20, which has a refractive index adjusted to at about 1.53 by controlling the blending proportion of MPETS and DPH and the loading of benzyl methacrylate. The cladding layer 42 is formed of the same material as described above, which has a refractive index adjusted to about 1.51 by a similar fashion. Each core layer 41 has an about 70 μm×about 70 μm square section. The glass substrate 43 comprises a 1 mm thick Tenpax glass substrate.

A light having a wavelength of 650 nm, 830 nm or 850 nm was allowed to enter the optical waveguide from its one end and was confirmed to exit from the other end of the optical waveguide. The optical propagation loss measurement using the cutback technique revealed a value of not exceeding 0.5 dB/cm.

The performance of the reliability test described in Example 12 revealed a reduction in optical propagation loss of not exceeding 1 dB.

For a comparative purpose, an optical waveguide was fabricated by forming the core layers 41 and the cladding layer 42 from a commercially available urethane acrylate resin, and then subjected to the same reliability test as described above. The results revealed a reduction in optical propagation loss of at least 3 dB.

Figure 15:
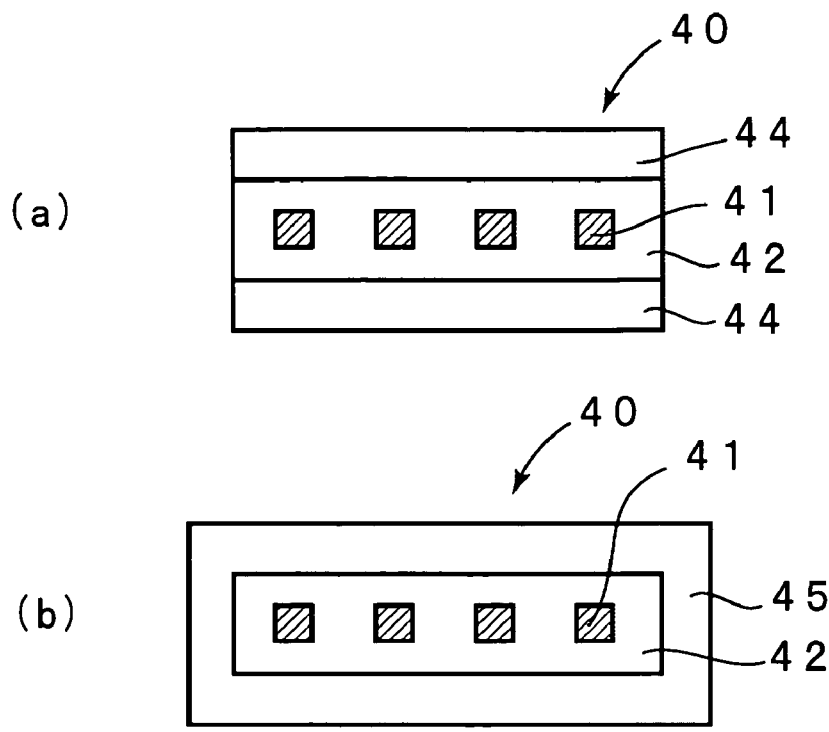
FIG. 15 is a sectional view, illustrating another embodiment of an optical waveguide in accordance with the present invention.

FIG. 15(a) is a view which illustrates an optical waveguide having a structure wherein the core layers 41 and the cladding layer 42 are interposed between flexible substrates in the form of 70 μM thick polyimide films 44.

FIG. 15(b) is a sectional view which illustrates an optical waveguide having a 70 μm thick, polyimide mold layer 45 that is formed in a mold to surround the cladding layer 42.

In case of using flexible substrates, as illustrated in FIGS. 15(a) and 15(b), it was possible to bend the optical waveguide, for example, to a radius of curvature of about 10 mm.

Figure 16:
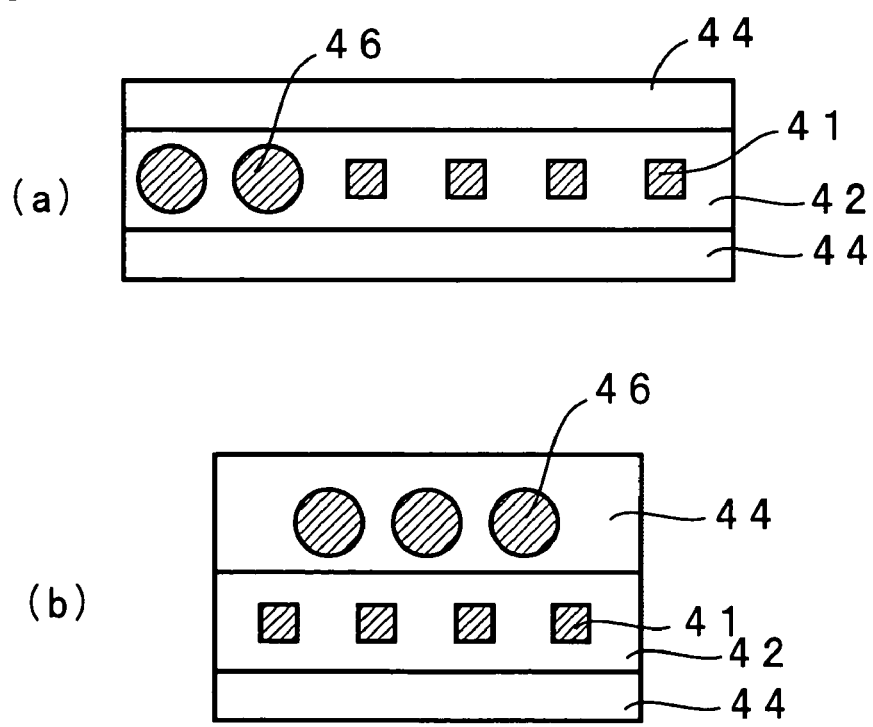
FIG. 16 is a sectional view, illustrating a further embodiment of an optical waveguide in accordance with the present invention.

FIG. 16 is a sectional view which illustrates another embodiment of an optical waveguide in accordance with the present invention.

In FIG. 16(a), electrical power copper wires 46 each having a diameter of 150 mm are located alongside the core layers 41. The cladding layer 42 is interposed between flexible substrates in the form of 70 μm thick polyimide films 44.

In the embodiment illustrated in FIG. 16(b), those electrical power copper wires 46 are located inside the upper polyimide film 44.

As illustrated in FIG. 16, the optical waveguide of the present invention may include an electrical power wire. Inclusion of such an electrical power wire permits simultaneous supply of information signals and a power by a single element.

The electrical power wire 46 may have a section of a rectangular shape.

EXAMPLE 29

Figure 17:
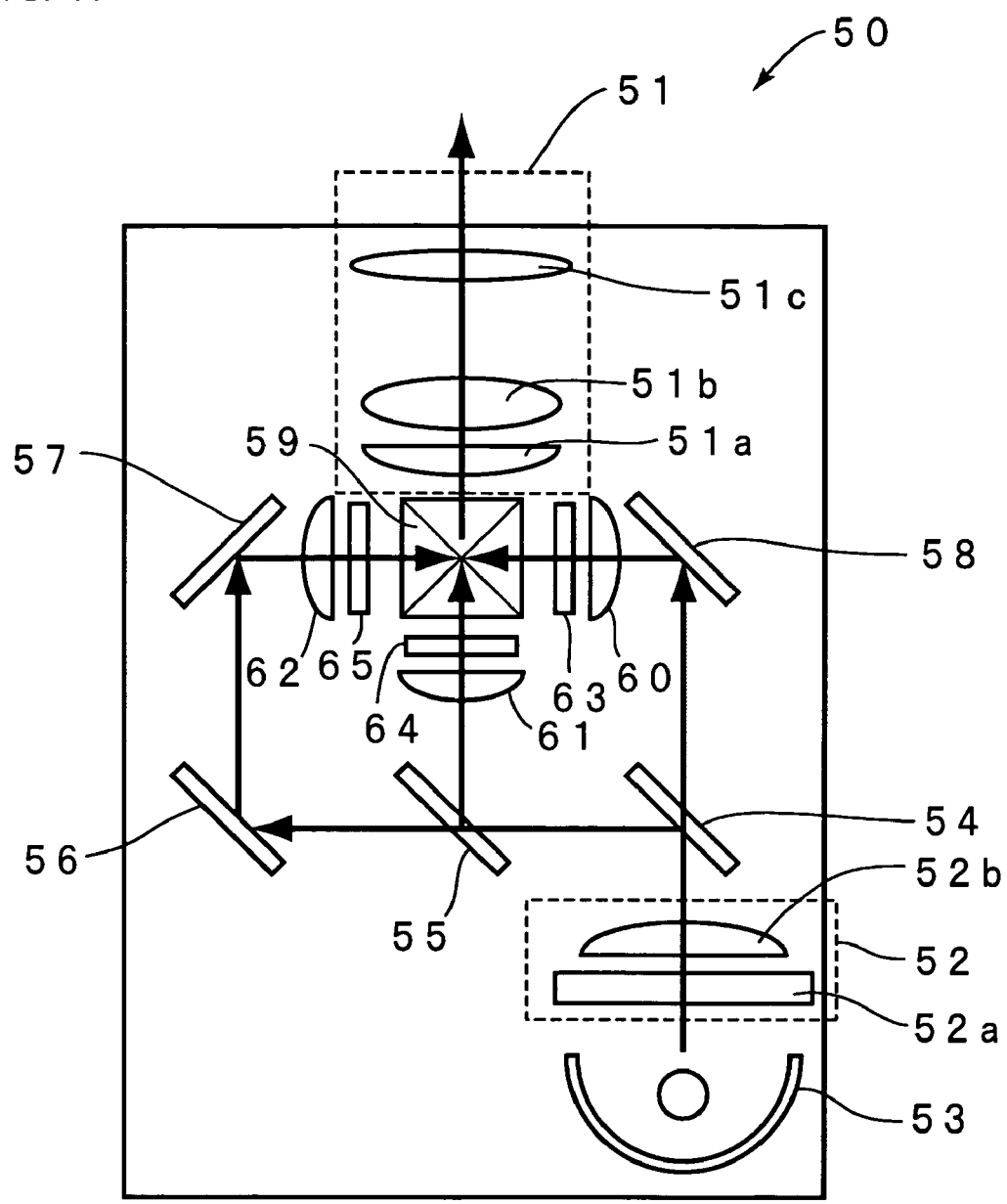
FIG. 17 is a schematic sectional view, showing an embodiment of a liquid crystal projector.

FIG. 17 is a schematic sectional view which shows a liquid crystal projector. An illumination optical system 52 is located above a light source 53. This illumination optical system 52 is composed of lenses 52a and 52b. A light emitted from the light source 53 strikes a half mirror 58. The light transmitted through the half mirror 54 reflects at a mirror 58 and then passes through a lens 60 and a liquid crystal panel 63 to enter a cross prism 59.

The light reflected at the half mirror 54 is directed to a half mirror 55. The light reflected at the half mirror 55 passes through a lens 61 and a liquid crystal panel 64 to enter the cross prism 59.

The light transmitted through the half mirror 55 is reflected at a mirror 56 and then at a mirror 57. The reflected passes through a lens 62 and a liquid crystal panel 65 to enter the cross prism 59.

The liquid crystal panel 65 is a liquid crystal panel for red (R). The liquid crystal panel 64 is a liquid crystal panel for green (G) and the liquid crystal panel 63 is a liquid crystal panel for blue (B). The lights passing through these liquid crystal panels are composed at the cross prism 59 to pass through the projection optical system 51 and exit to an outside. The projection optical system 51 is composed of lenses 51a, 51b and 51c.

The light source 53 may comprise a metal halide lamp, mercury lamps, LED, or the like.

Because the light source 53 is a source of heat, it has been conventionally required that the lenses 51a-51c of the projection optical system 51 should be spaced a certain distance from the light source 53.

However, the optical part of the present invention can be located closer to the light source 53 because it is formed of the organometallic polymer material having good heat resistance as described above.

Figure 18:
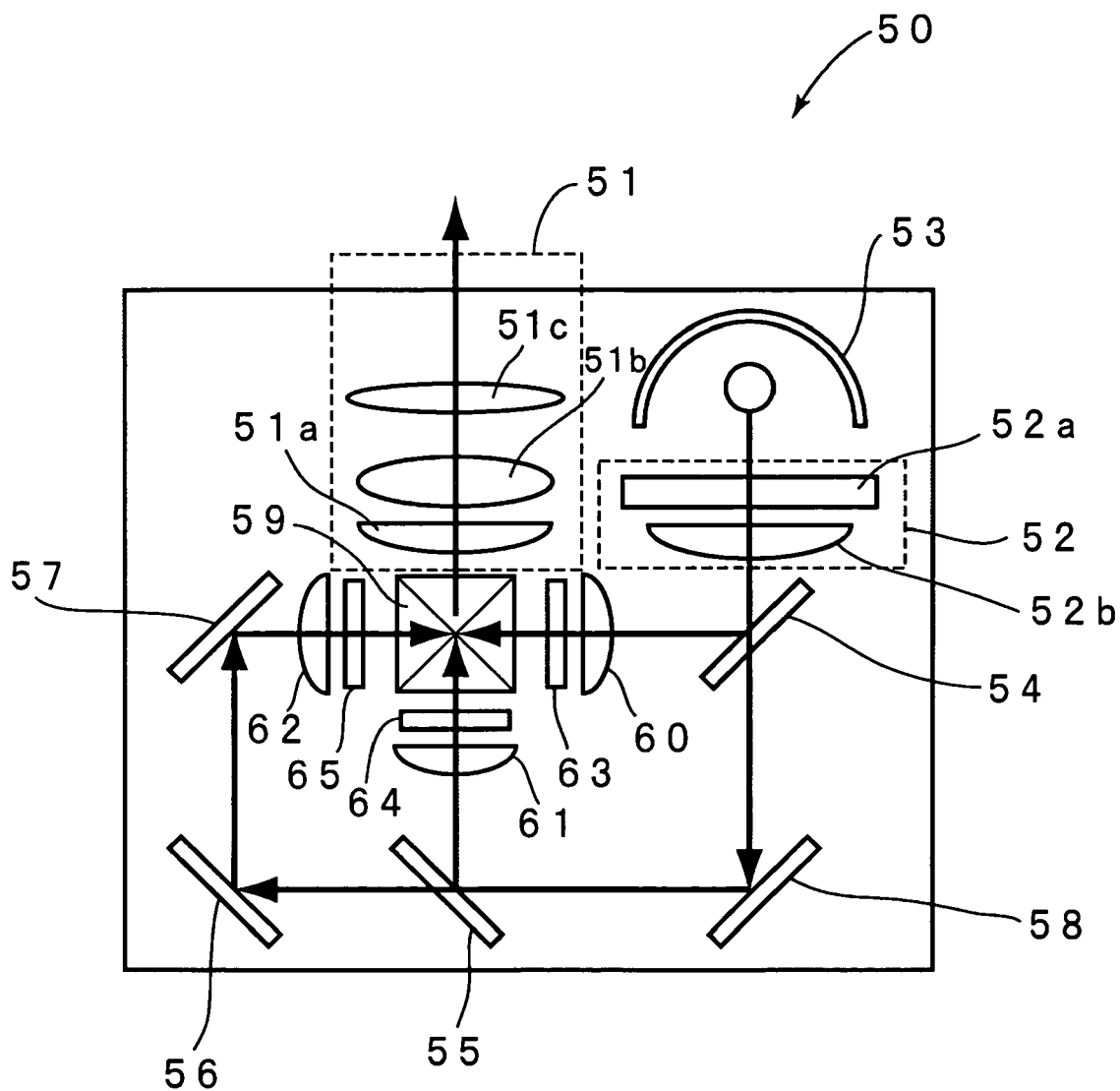
FIG. 18 is a schematic sectional view, showing an embodiment of a liquid crystal projector in accordance with the present invention.

FIG. 18 is a schematic sectional view which shows an embodiment of a liquid crystal projector in accordance with the present invention.

In the embodiment shown in FIG. 18, the lenses 51a-51c of the projection optical system 51 are formed of the lens of Example 25. Accordingly, the light source 53 can be located closer to the projection optical system 51, as shown in Table 18. This permits reduction in size of the liquid crystal projector 50.

In the liquid crystal projector shown in FIG. 18, a light emitted from the light source 53 passes through the illumination optical system 52 and then reflects at the half mirror 54. The light reflected at the half mirror 54 passes through the lens 60 and the liquid crystal panel 63 to enter the cross prism 59. The light transmitted through the half mirror 54 is reflected at the mirror 58 to direct toward the half mirror 55. The light reflected at the half mirror 55 passes through the lens 61 and the liquid crystal panel 64 to enter the cross prism 59. The light transmitted through the half mirror 55 is reflected at the mirror 56 and then at the mirror 57. The reflected light passes through the lens 62 and the liquid crystal panel 65 to enter the cross prism 59. The lights transmitted through these liquid crystal panels 63, 64 and 65 are composed at the cross prism 59 and allowed to pass through the projection optical system 51 and exit to an outside.

The liquid crystal projectors shown in FIGS. 17 and 18 are of the three-panel transmission type that utilizes three independent liquid crystal panels for RGB. The same results can be obtained with the use of a projector of the single-panel transmission type that utilizes a single liquid crystal panel for composite RGB.

Figure 19:
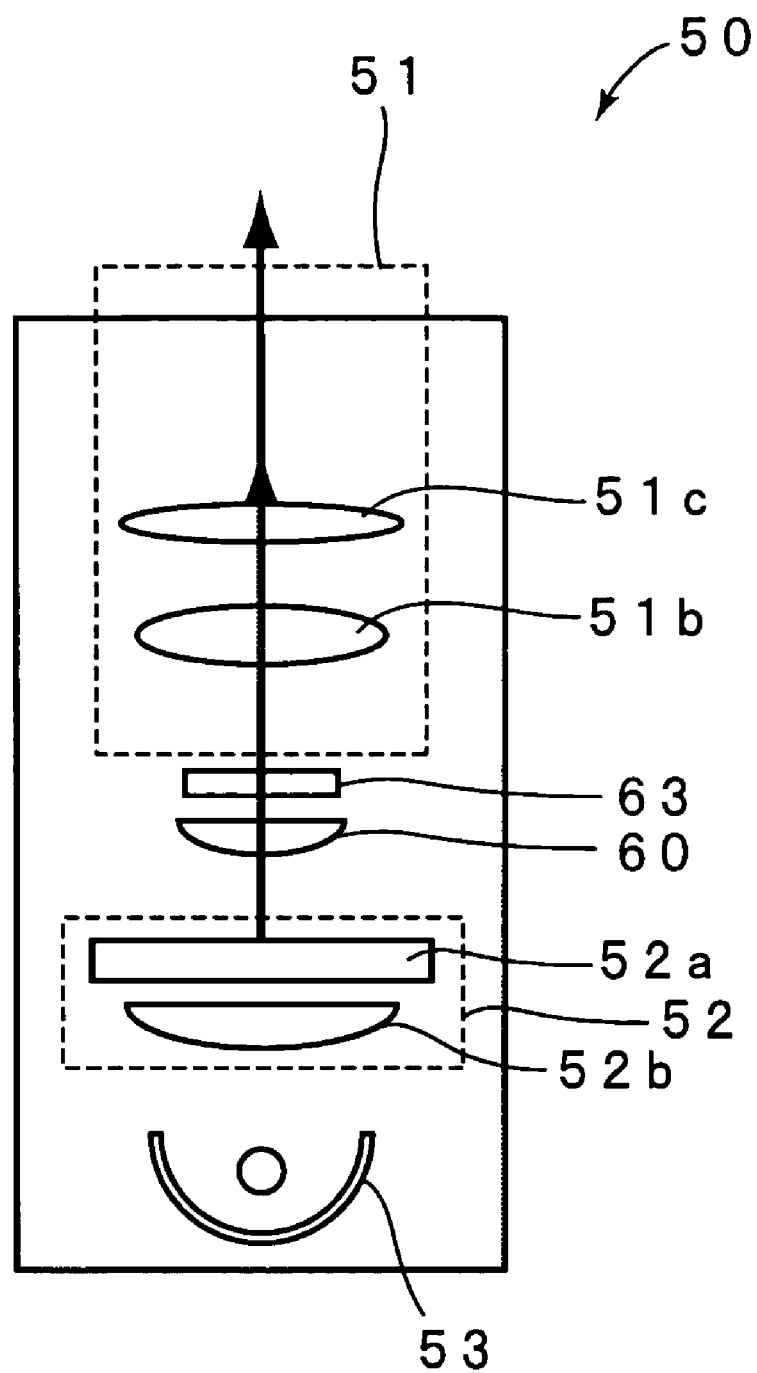
FIG. 19 is a schematic sectional view, showing another embodiment of a liquid crystal projector in accordance with the present invention.

The liquid crystal projector shown in FIG. 19 uses a white LED as the light source 53 in order to achieve further size reduction. As shown in FIG. 19, a light emitted from the light source 53 is passed through the illumination optical system 52, the lens 60, the liquid crystal panel 63 and the projection optical system 51 and then allowed to exit to an outside.

As shown in FIG. 19, the light source 53, projection optical system 51 and the others between them may be arranged on a linear line. In this case, if the lenses 51a, 51b and 51c of the projection optical system 51 each comprises the lens of Example 25, a focal length can be reduced. As a result, an overall length of the crystal liquid projector can be reduced.

The invention claimed is:

1. An organometallic polymer material characterized as containing an organometallic polymer having an —M—O—M— bond (M indicates a metal atom), a metal alkoxide having a single hydrolyzable group and/or its hydrolysate, and an organic polymer having a urethane bond and a methacryloxy or acryloxy group.

2. The organometallic polymer material as recited in claim 1, characterized as further containing an organic anhydride and/or an organic acid.

3. The Organometallic polymer material as recited in claim 1, characterized in that said organometallic polymer is synthesized by hydrolysis and polycondensation of at least two organometallic compounds having a hydrolyzable group.

4. The organometallic polymer material as recited in claim 3, characterized in that at least one of said organometallic compounds has a functional group capable of crosslinking by exposure to heat and/or an energetic radiation.

5. A method for production of the organometallic polymer material as recited in claim 3, characterized as comprising the steps of:

allowing said organometallic compounds to undergo hydrolysis and polycondensation in an organic solvent to synthesize an organometallic polymer;

subsequent to removal of said organic solvent, adding said organic anhydride and/or organic acid;

subsequent to removal of an excess portion of said organic anhydride and/or organic acid, adding said metal alkoxide and/or its hydrolysate; and subsequent to removal of an excess portion of said metal alkoxide or its hydrolysate, adding said organic polymer.

6. The method for production of the organometallic polymer material as recited in claim 5, characterized as further comprising the step of performing rinsing to remove hydrophilic components, subsequent to removal of said excess portion of the metal alkoxide and/or its hydrolysate but prior to addition of said organic polymer.

7. The organometallic polymer material as recited in claim 1, characterized in that said organic polymer contains a polybutadiene structure and an aryl group in its skeleton.

8. The organometallic polymer material as recited in claim 1, characterized in that a difference in refractive index between a cured product of said organometallic polymer and a cured product of said organic polymer does not exceed 0.01.

9. The organometallic polymer material as recited in claim 1, characterized in that said metal atom M in the organometallic polymer is Si.

10. The organometallic polymer material as recited in claim 1, characterized in that a metal in the metal alkoxide is Si.

11. The organometallic polymer material as recited in claim 1, characterized in that the material shows an absorption peak around 850 $cm^{-1}$, due to said metal alkoxide, in the infrared absorption spectroscopic (IR) analysis.

12. The organometallic polymer material as recited in claim 1, characterized in that the material contains fine particles composed of at least one of a metal, metal oxide and metal nitride and having a particle size of not exceeding 100 nm.

13. An optical part characterized as having a light transmissive region formed of the organometallic polymer material as recited in claim 1.

14. The optical part as recited in claim 13, characterized in that said light transmissive region is formed on a translucent base material.

15. The optical part as recited in claim 14, characterized in that said base material is a high-refractive glass or high-refractive ceramic.

16. The optical part as recited in claim 13, characterized in that it is a composite aspherical lens.

17. A camera module characterized as including the optical part as recited in claim 13.

18. A projector characterized as including the optical part as recited in claim 13.

19. An optical waveguide characterized as including a core and/or cladding layer formed of the organometallic polymer material as recited in claim 1.

* * * * *